US012688184B2

(12) United States Patent (10) Patent No.: US 12,688,184 B2
Narayanam et al. (45) Date of Patent: Jul. 21, 2026

(54) TRANSLATING NATURAL LANGUAGE INPUT USING LARGE LANGUAGE MODELS

(71) Applicant: Adobe Inc., San Jose, CA (US)

(72) Inventors: Ramasuri Narayanam, San Jose, CA (US); Chetan Sharma, Agra (IN); Som Satapathy, San Jose, CA (US); Siddhartha Kartikaye Goel, San Jose, CA (US); Shiv Kumar Saini, San Jose, CA (US); Shaddy Garg, San Jose, CA (US)

(73) Assignee: Adobe Inc., San Jose, CA (US)

(*) Notice: Subject to any disclaimer, the term of this patent is extended or adjusted under 35 U.S.C. 154(b) by 57 days.

(21) Appl. No.: 18/420,464

(22) Filed: Jan. 23, 2024

(65) Prior Publication Data

US 2025/0238418 A1    Jul. 24, 2025

(51) Int. Cl.
G06F 16/242        (2019.01)
G06F 40/40         (2020.01)
(52) U.S. Cl.
CPC ........ G06F 16/2425 (2019.01); G06F 16/243 (2019.01); G06F 40/40 (2020.01)
(58) Field of Classification Search
CPC ..... G06F 16/2425; G06F 16/243; G06F 40/40
See application file for complete search history.

(56) References Cited

U.S. PATENT DOCUMENTS

| | | | |
|---|---|---|---|
| 12,099,975 B1* | 9/2024 | Cai | G06F 40/40 |
| 2018/0121500 A1* | 5/2018 | Reschke | G06F 16/2428 |
| 2018/0285480 A1* | 10/2018 | Standefer, III | G06F 16/9038 |
| 2024/0394249 A1* | 11/2024 | Cunningham | G06F 16/248 |
| 2025/0086213 A1* | 3/2025 | Dilipkumar | G06F 16/24522 |
| 2025/0139367 A1* | 5/2025 | Manandise | G06F 40/284 |

OTHER PUBLICATIONS

Tomaz Bratanic, "LangChain Cypher Search: Tips Tricks," Neo4j, Jun. 2, 2023, 14 pages. [online source] URL: https://neo4j.com/developer-blog/langchain-cypher-search-tips-tricks]/.
Mohammadreza Pourreza et al., "DIN-SQL: Decomposed In-Context Learning of Text-to-SQL with Self-Correction," arXiv:2304.11015, Apr. 21, 2023, [online source] URL: https://arxiv.org/abs/2304.11015.
Haoyang Li et al., "RESDSQL: Decoupling Schema Linking and Skeleton Parsing for Text-to-SQL," In Proceedings of the AAAI Conference on Artificial Intelligence, vol. 37, No. 11, Jun. 2023, pp. 13067-13075.

(Continued)

*Primary Examiner* — Kris E Mackes
(74) *Attorney, Agent, or Firm* — FIG. 1 Patents

(57) ABSTRACT

In one aspect, a query management module executing on a processor receives, from a large language model (LLM), a graph query generated by the LLM based on a natural language query (NLQ). A validation module identifies an error in the graph query. The query management module provides an indication of the error to the LLM. The query management module receives a modified graph query from the LLM. The validation module validates the modified graph query. Based on the validation of the modified graph query, the query management module executes the modified graph query against a knowledge graph to return a result as a response to the NLQ.

20 Claims, 14 Drawing Sheets

(56)            References Cited

OTHER PUBLICATIONS

Jinyang Li, "Graphix-T5: Mixing Pre-Trained Transformers with Graph-Aware Layers for Text-to-SQL Parsing," arXiv preprint arXiv:2301.07507, Jan. 18, 2023, 10 pages.

Han Fu et al., "CatSQL: Towards Real World Natural Language to SQL Applications," Proceedings of the VLDB Endowment, vol. 16, No. 6, 2023, Oct. 2023, pp. 1534-1547.

Yiqun Hu et al., "Importance of Synthesizing High-quality Data for Text-to-SQL Parsing," AWS AI Labs, ACL, Jul. 2023, pp. 1327-1343.

Ruoxi Sun et al., "SQL-PaLM: Improved Large Language Model Adaptation for Text-to-SQL," arXiv:2306.00739v3, Jun. 25, 2023, 16 pages.

Steven Bird et al., "Natural Language Processing with Python," O'Reilly Media Inc, 1st Edition, Jun. 2009, ISBN: 9780596516499, pp. 1-22.

Spider, "Yale Semantic Parsing and Text-to-SQL Challenge," Spider 1.0, Sep. 2018, 8 pages. [online source] URL: https://yale-lily.github.io/spider.

* cited by examiner

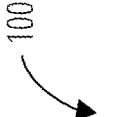
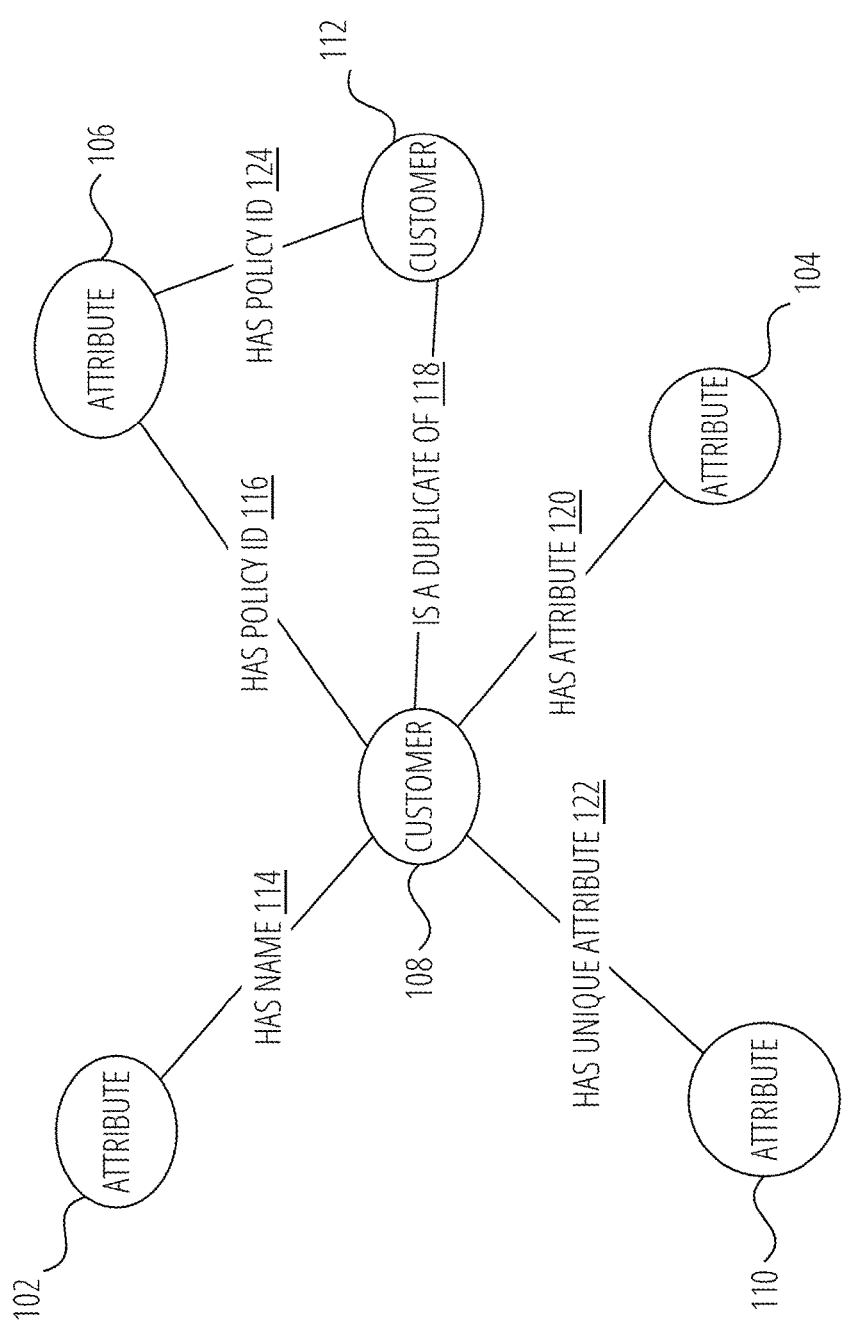
FIG. 1

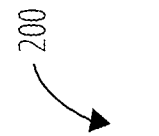
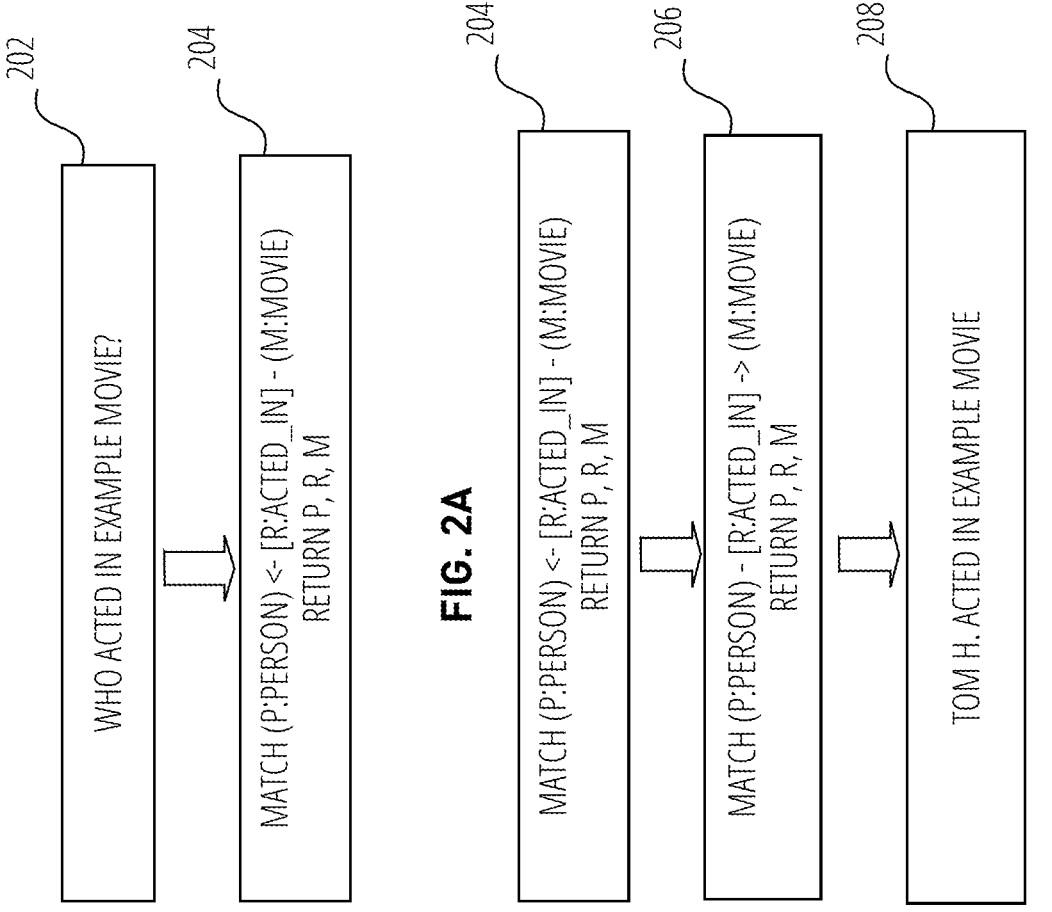
200
202
WHO ACTED IN EXAMPLE MOVIE?
204
MATCH (P:PERSON) <- [R:ACTED_IN] - (M:MOVIE)
RETURN P, R, M
FIG. 2A
204
MATCH (P:PERSON) <- [R:ACTED_IN] - (M:MOVIE)
RETURN P, R, M
206
MATCH (P:PERSON) - [R:ACTED_IN] -> (M:MOVIE)
RETURN P, R, M
208
TOM H. ACTED IN EXAMPLE MOVIE
FIG. 2B

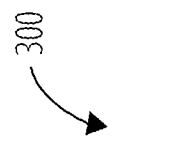
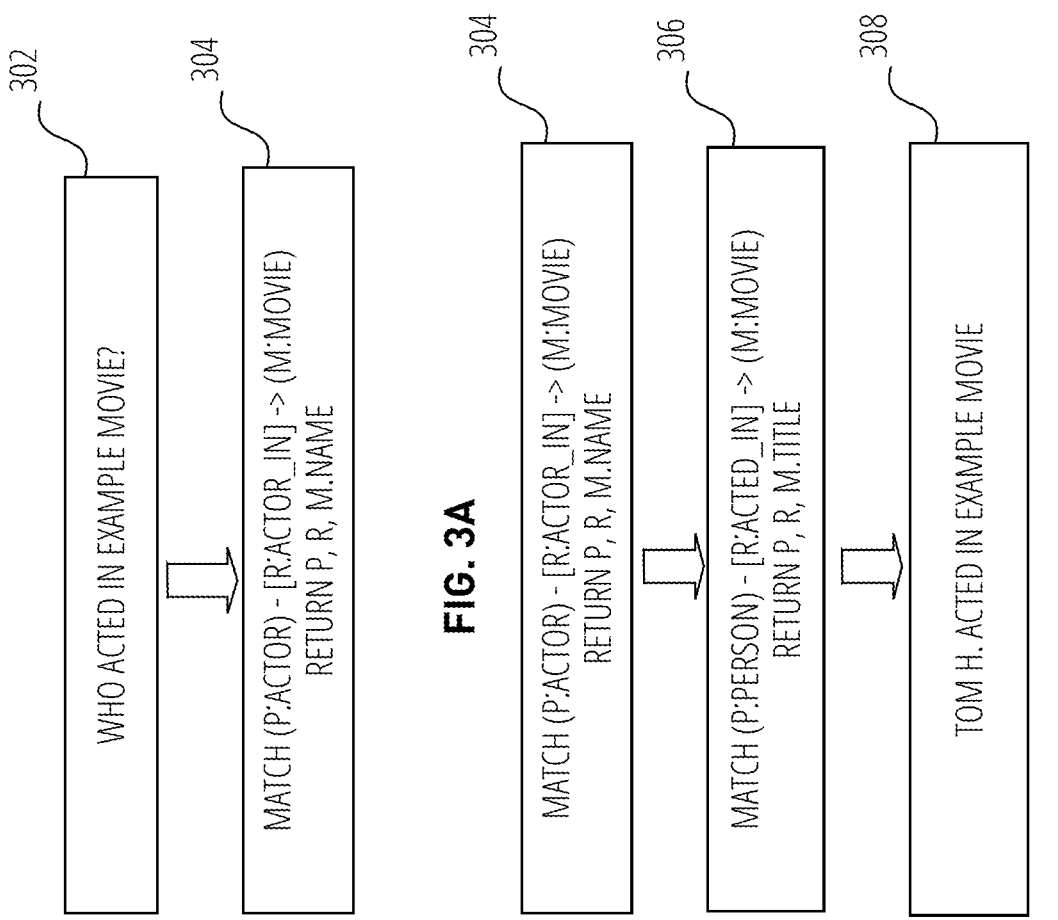
302 WHO ACTED IN EXAMPLE MOVIE?
304 MATCH (P:ACTOR) - [R:ACTOR_IN] -> (M:MOVIE) RETURN P, R, M.NAME
FIG. 3A
304 MATCH (P:ACTOR) - [R:ACTOR_IN] -> (M:MOVIE) RETURN P, R, M.NAME
306 MATCH (P:PERSON) - [R:ACTED_IN] -> (M:MOVIE) RETURN P, R, M.TITLE
308 TOM H. ACTED IN EXAMPLE MOVIE
FIG. 3B
300

400

402

WHICH SEGMENTS ARE FORWARDED TO HTTP API

404

GRAPH QUERY

406

BASED ON YOUR QUERY, YOU ARE LOOKING FOR SEGMENTS THAT ARE FOWARDED TO AN HTTP API. NO SEGMENTS IN THE KB MATCHED THIS CRITERION. HOWEVER, "TEST HTTP DESTINATION" IS SIMLIAR TO YOUR QUERY. WOULD YOU LIKE TO RE-RUN THE QUERY USING THIS TERM?

408

MODIFIED GRAPH QUERY

410

SEGMENT N IS FORWARDED TO TEST HTTP DESTINATION

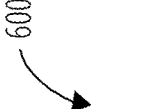
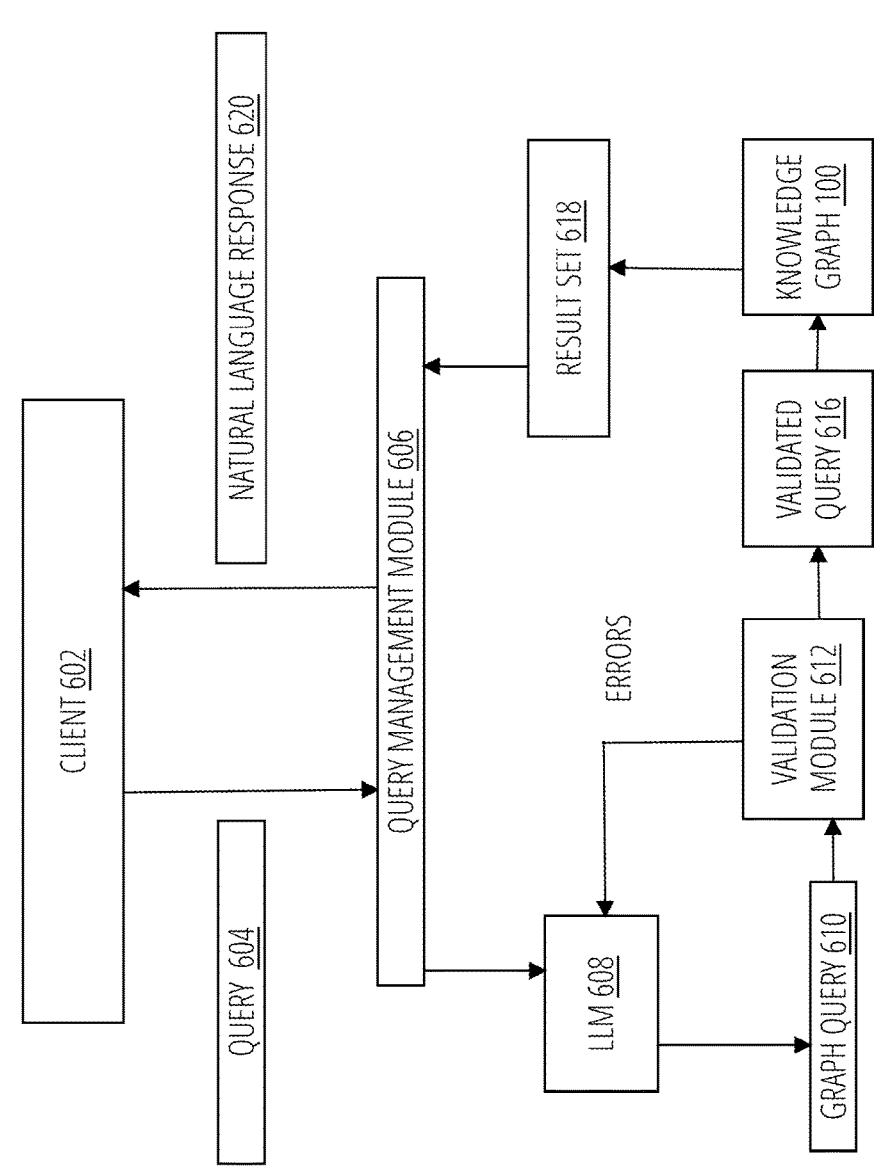
FIG. 6

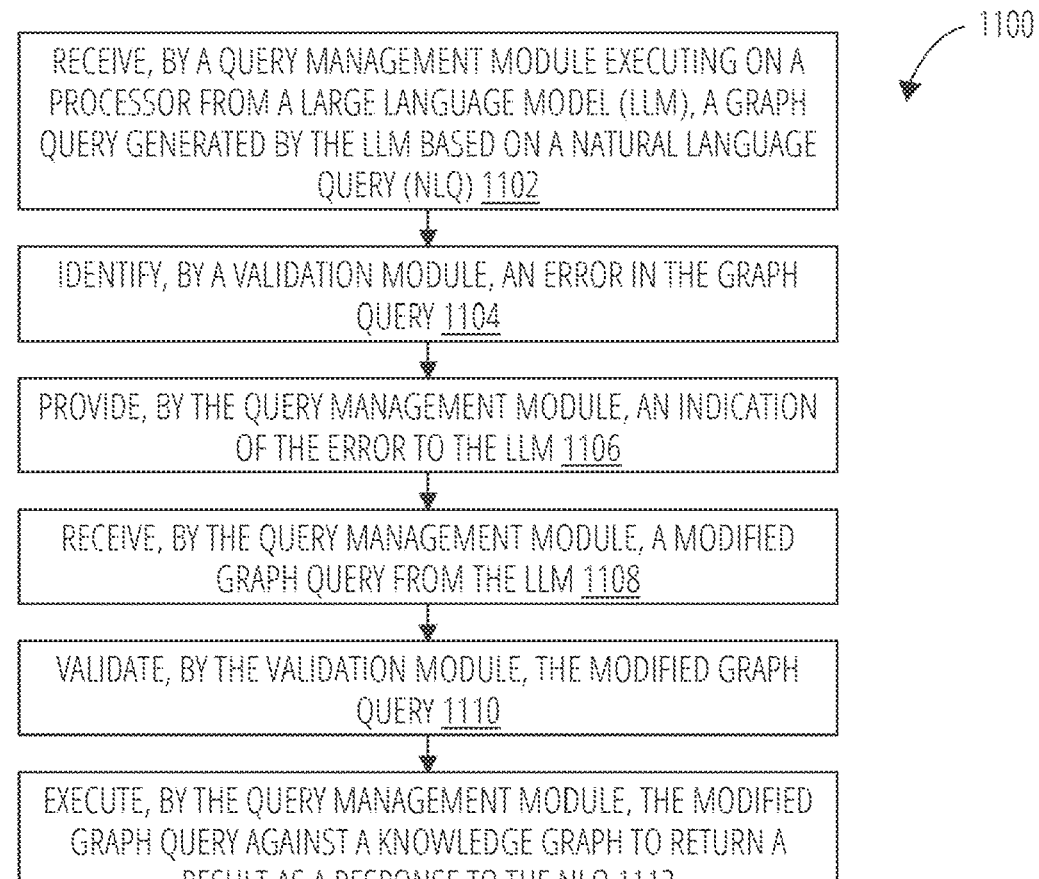

RECEIVE, BY A QUERY MANAGEMENT MODULE EXECUTING ON A PROCESSOR FROM A LARGE LANGUAGE MODEL (LLM), A GRAPH QUERY GENERATED BY THE LLM BASED ON A NATURAL LANGUAGE QUERY (NLQ) 1102

IDENTIFY, BY A VALIDATION MODULE, AN ERROR IN THE GRAPH QUERY 1104

PROVIDE, BY THE QUERY MANAGEMENT MODULE, AN INDICATION OF THE ERROR TO THE LLM 1106

RECEIVE, BY THE QUERY MANAGEMENT MODULE, A MODIFIED GRAPH QUERY FROM THE LLM 1108

VALIDATE, BY THE VALIDATION MODULE, THE MODIFIED GRAPH QUERY 1110

EXECUTE, BY THE QUERY MANAGEMENT MODULE, THE MODIFIED GRAPH QUERY AGAINST A KNOWLEDGE GRAPH TO RETURN A RESULT AS A RESPONSE TO THE NLQ 1112

COMPUTER-READABLE STORAGE MEDIUM 1202

COMPUTER EXECUTABLE INSTRUCTIONS 1204

COMPUTER EXECUTABLE INSTRUCTIONS FOR LLM 508 1206

COMPUTER EXECUTABLE INSTRUCTIONS FOR QUERY MANAGEMENT MODULE 506 1208

COMPUTER EXECUTABLE INSTRUCTIONS FOR VALIDATION MODULE 512 1210

TRANSLATING NATURAL LANGUAGE INPUT USING LARGE LANGUAGE MODELS

BACKGROUND

Knowledge graphs are data structures that are searched using graph queries. A user may initiate the search of a knowledge graph using a natural language query that is converted to a graph query. However, a graph query that is generated based on a natural language query can include various errors. In such cases, the erroneous graph query cannot be executed against the knowledge graph and/or may return incorrect results when executed. As such, these graph queries and/or any returned results from the knowledge graph require significant post processing to remove erroneous outcomes.

BRIEF SUMMARY

Embodiments are generally directed to accurately generating graph queries based on natural language queries such that the graph queries may be executed against a knowledge graph to return a result set. In some embodiments, a user submits a natural language query (NLQ) targeting the knowledge graph. An artificial intelligence component such as a large language model (LLM) generates the graph query based on the NLQ. A validation component analyzes the query for any errors. If errors are detected, an indication of the error is returned to the LLM, which generates a modified graph query. The validation component executes the modified query against the knowledge graph based on a determination that the modified graph query does not contain errors.

Any of the above embodiments may be implemented as instructions stored on a non-transitory computer-readable storage medium and/or embodied as an apparatus with a memory and a processor configured to perform the actions described above. It is contemplated that these embodiments may be deployed individually to achieve improvements in resource requirements and library construction time. Alternatively, any of the embodiments may be used in combination with each other in order to achieve synergistic effects, some of which are noted above and elsewhere herein.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 1 illustrates an aspect of the subject matter in accordance with one embodiment.

FIG. 2A illustrates an aspect of the subject matter in accordance with one embodiment.

FIG. 2B illustrates an aspect of the subject matter in accordance with one embodiment.

FIG. 3A illustrates an aspect of the subject matter in accordance with one embodiment.

FIG. 3B illustrates an aspect of the subject matter in accordance with one embodiment.

FIG. 6 illustrates an operating environment 600 in accordance with one embodiment.

FIG. 11 illustrates a logic flow 1100 in accordance with one embodiment.

DETAILED DESCRIPTION

Figure 4:
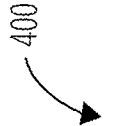
FIG. 4 illustrates an aspect of the subject matter in accordance with one embodiment.

Exemplary embodiments are generally directed to techniques for generating graph queries that can be accurately executed against a knowledge graph. Some embodiments are particularly directed to using techniques to generate graph queries based on a received natural language query (NLQ). One or more post-processing operations are performed to detect errors in the graph queries. The detected errors are used to generate modified graph queries that can be executed against the knowledge graph. These techniques overcome conventional techniques by increasing the accuracy of results returned from a knowledge graph based on a modified query relative to results returned from the knowledge graph based on an unmodified graph query that contains errors. Although exemplary embodiments are described in connection with a particular system or architecture, the principles described herein can also be applied to other types of systems and/or architectures as well. Embodiments are not limited in this context.

More specifically, embodiments disclosed herein include a query management module receiving a NLQ from a user. The query management module instructs a large language model (LLM) to generate a graph query based on the NLQ. The LLM then generates the graph query. A validation module performs one or more post-processing operations to validate the graph query. For example, the post-processing operations includes the validation module validating one or more relationships in the graph query based on existing relationships in the knowledge graph. In addition and/or alternatively, the post-processing operations include the validation module validating a direction of relationships in the graph query based on directions of existing relationships in the knowledge graph. In addition and/or alternatively, the post-processing operations include the validation module validating entities specified in the graph query against existing properties of the entities in the knowledge graph. In addition and/or alternatively, the post-processing operations include the validation module determining whether the graph query returns a null set (or an empty set). If the validation module identifies errors via one or more of the post-processing operations, the validation module provides indications of the errors to the LLM. Doing so causes the LLM to self-correct and generate a modified graph query. The modified graph query is validated by the validation module. The validated query is then executed against the knowledge graph to return a result set. A natural language response is generated based on the result set from the knowledge graph and returned to the user.

Embodiments disclosed herein provide post-processing operations to programmatically identify errors in graph queries generated by the LLMs. By programmatically identifying the errors, the LLMs are instructed to regenerate the graph queries that do not include errors. Doing so allows these graph queries to be executed more quickly against the knowledge graph by requiring less time and fewer computing resources. Furthermore, embodiments disclosed herein reduce the amount of time and resources required to manually fine tune the LLM. For example, the post-processing operations may remove some or all of the fine-tuning conventionally required to cause the LLMs to generate correct graph queries. Doing so makes question answering systems of the disclosure more accessible and efficient for a broader range of applications. Furthermore, the amount of time, effort, and computing resources required to train these models is reduced, as little or no explicit training is required to improve the output of the models. Further still, embodiments disclosed herein can applied to any type of data and/or any domain, enabling the extraction of valuable insights from any type of data repository, which in turn enhances data-driven decision making and facilitates better understanding of products, services, and/or customer behavior. Further still, embodiments disclosed herein generate graph queries that are directly executed against a knowledge graph. Doing so means that the size of the knowledge graph does not impact the performance in executing the query, as the execution of the query depends on the list of entities and relations present in the query. Therefore, embodiments of the disclosure are suitable for extensive datasets and complex information structures. Further still, reducing the training time and resources and minimizing the number of application programming interface (API) calls to the models reduces the amount of time and computing resources required to implement the knowledge graph query generation systems disclosed herein.

Term Definitions

As used herein, the term "knowledge graph" refers to a structured representation of knowledge that captures information about entities (e.g., people, places, things, etc.) and the relationships between them. A knowledge graph is a type of knowledge base that uses a graph structure to organize data, where nodes represent entities (with associated properties) and edges represent relationships between these entities. Knowledge graphs store and represent knowledge in a way that is both human-readable and machine-understandable.

As used herein, the term "large language model" (LLM) refers to a neural network architecture. The LLM is trained on a diverse dataset comprising text from various sources, including knowledge graphs, examples of natural language queries, and corresponding graph-based representations (e.g., graph queries). The training process involves optimizing the model parameters to maximize its ability to understand and generate graph queries. The architecture of the LLM includes layers of neurons with weighted connections that enable the model to capture intricate language patterns.

As used herein, the term "query management module" refers to a component that manages the execution, coordination, and optimization of graph queries for knowledge graphs. The query management module to manages the process of translating natural language queries into a graph query that can be executed against the knowledge graph. The query management module optimizes the execution of these queries for efficiency and accuracy, thereby returning relevant results to the user. The query management module includes logic to converse with a user in natural language, e.g., such as a chatbot. The query management module therefore includes natural language generation logic.

As used herein, the term "validation module" refers to a component that identifies errors in graph queries generated by LLMs. The validation module considers one or more rules and/or heuristics to analyze queries. For example, the validation module validates relationships in the graph query against known relationships in the knowledge graph, validates a direction of the relationships in the graph query based on known directions of relationships in the knowledge graph, validates the entities specified in the graph query against the properties of the entities in the knowledge graph, and/or validates ambiguous graph queries.

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, well known structures and devices are shown in block diagram form in order to facilitate a description thereof. The intention is to cover all modifications, equivalents, and alternatives consistent with the claimed subject matter.

In the Figures and the accompanying description, the designations "a" and "b" and "c" (and similar designators) are intended to be variables representing any positive integer. Thus, for example, if an implementation sets a value for a=5, then a complete set of components 121 illustrated as components 121-1 through 121-$a$ may include components 121-1, 121-2, 121-3, 121-4, and 121-5. The embodiments are not limited in this context.

Operations for the disclosed embodiments may be further described with reference to the following figures. Some of the figures may include a logic flow. Although such figures presented herein may include a particular logic flow, it can be appreciated that the logic flow merely provides an example of how the general functionality as described herein can be implemented. Further, a given logic flow does not necessarily have to be executed in the order presented unless otherwise indicated. Moreover, not all operations illustrated in a logic flow may be required in some embodiments. In addition, a logic flow may be implemented by a hardware element, a software element executed by a processor, or any combination thereof. The embodiments are not limited in this context.

FIG. 1 depicts an example knowledge graph 100. The knowledge graph 100 comprises a plurality of nodes including node 102, a node 104, a node 106, a node 108, a node 110, and a node 112. The knowledge graph 100 further includes a plurality of edges including an edge 114, an edge 116, an edge 118, an edge 120, an edge 122, and an edge 124. The numbers of edges and nodes in the knowledge graph 100 should not be considered limiting of the disclosure, as the knowledge graph 100 can have any number of nodes and/or any number of edges. Embodiments are not limited in these contexts.

The knowledge graph 100 is representative of any type of directed, heterogenous knowledge graph. In some embodiments, the knowledge graph 100 encodes information in a 3-tuple format. One example 3-tuple format is [head entity, relationship, tail entity]. Therefore, in the knowledge graph 100, entities are represented by nodes, and the edges (which have directionality components) represent relationships between the entities connected via a given edge.

A given node may correspond to any type of entity. In the example knowledge graph 100, nodes 108 and 112 are associated with customers. Similarly, nodes 102, 104, 106, and 110 are associated with attributes. Edges 114-120 define relationships between two given nodes. For example, edge 114, which connects node 102 and node 108, indicates the customer of node 108 has a name defined by attribute node 102. As can be realized, the directionality of this relationship is part of the edge 114 relationship, as a customer has a name attribute (instead of the opposite direction, e.g., a name attribute having a customer). Embodiments are not limited in these contexts.

In some embodiments, relationships defined by edges 114-120 have multiple hops. For example, a first relationship is defined by edge 122 and a second relationship is defined by edge 116. As such, a multiple hop relationship is defined by edges 114, 116. Embodiments are not limited in these contexts.

FIG. 2A illustrates a schematic 200 for translating natural language inputs to one or more graph queries, according to one embodiment. Generally, a user may submit a natural language query 202 via a computing system. The query is representative of any type of query and is processed against a knowledge graph such as knowledge graph 100. For example, the natural language query 202 may be related to identifying an actor in a movie. A large language model (LLM) generates an example graph query 204 based on the natural language query 202. A language of the graph query 204 is of any type of format compatible with the knowledge graph 100. Example graph query languages include Cipher®, SPARQL, Gremlin, or any other graph-based query language. Embodiments are not limited in these contexts.

A validation module validates the graph query 204 and determine the graph query 204 includes one or more errors. In the example depicted in FIG. 2A, the graph query 204 includes at least an error in the direction of a relationship in the knowledge graph 100. For example, the graph query 204 has reversed the direction of the relationship between a person and a movie, such that the graph query 204 would only return results for movies that acted in actors (a nonsensical result). Instead, the direction of the query should be reversed.

In some embodiments, the error is detected by identifying the direction of the relationship in the graph query 204 and comparing the direction to a direction of a corresponding relationship in the knowledge graph 100. If the directions of the relationships do not match, the error is identified. Because of the error, the graph query 204 cannot be executed against the knowledge graph 100 and/or will not return valid results from the knowledge graph 100.

FIG. 2B depicts an embodiment where the error identified in the graph query 204 is returned to the LLM for generation of a modified graph query 206. In some embodiments, an indication of the error is provided to the LLM to allow the LLM to generate the modified graph query 206. In some embodiments, the properties of the relationship R are provided to the LLM with the indication of the error. The LLM may then generate a modified graph query based on the indication of the error and the properties of the relationship R. As shown, the modified graph query 206 includes the correct direction of the relationship, such that a result from the knowledge graph 100 may be returned. As shown, a natural language response 208 may be returned based on the result from the knowledge graph 100. Embodiments are not limited in these contexts.

FIG. 3A illustrates a schematic 300 for translating natural language inputs to one or more graph queries, according to one embodiment. Generally, a user may submit a natural language query 302 via a computing system. The natural language query 302 is the same or different than natural language query 202. The LLM generates an example graph query 304 based on the natural language query 302. The validation module may validate the graph query 304 and determine the graph query 304 includes one or more errors. In the example depicted in FIG. 3A, the graph query 204 includes at least an error with the "actor" property of the person entity "P", an error in the "ACTOR_IN" property of relationship "R", and the "name" property of the movie entity "M" in the result portion.

The validation module may identify the error with the "actor" property of the person entity "P" by retrieving the properties associated with the person entity P in the knowledge graph 100. The validation module may then determine that "actor" is not a valid property of the person entity P in the knowledge graph 100, e.g., by comparing "actor" to each property of P in the knowledge graph 100 and determining all comparisons do not result in a match. Similarly, the validation module may determine that "ACTOR_IN" is not a valid property of the relationship R in the knowledge graph 100, e.g., by retrieving all properties of relationship R from the knowledge graph 100 and comparing "ACTOR_IN" to each retrieved property and determining all comparisons do not result in a match. Furthermore, the validation module may determine that "name" is not a valid property of the entity M in the knowledge graph 100 by retrieving the properties of entity M from the knowledge graph 100 and determining "name" is not a specified property of M (e.g., based on a comparison of "name" to each property and determining each comparison does not result in a match).

Because of these errors, the graph query 304 cannot be executed against the knowledge graph 100 and/or will not return valid results from the knowledge graph 100. Advantageously, however, the validation module provides, to the LLM, an indication of each error identified in the graph query 304. In some embodiments, the validation module provides the valid knowledge graph 100 properties for each identified entity and/or relationship (e.g., the properties of the person entity P, the properties of relationship R, and the properties of entity M). The LLM then generates a modified graph query 306 based on the information provided by the validation module.

FIG. 3B illustrates the modified graph query 306 generated by the LLM. The validation module validates the modified graph query 306 by determining no errors are in the modified graph query 306. The modified graph query 306 is then executed against the knowledge graph 100 to return a result. A natural language response 406 is then returned as responsive to the natural language query 302.

FIG. 4 is a schematic 400 illustrating an example of translating natural language inputs to one or more graph queries, according to one embodiment. As shown, a user submits a natural language query 402. The LLM generates a graph query 404 based on the natural language query. The validation module validates the graph query 404 and determines no errors exist in the graph query 404. The graph query 404 is executed against the knowledge graph 100. However, no results are returned from the knowledge graph 100 based on the graph query 404.

A natural language response 406 indicates, to the user, that no results were returned from the knowledge graph 100. Advantageously, however, the natural language response 406 indicates that a related term may return the desired results. The query management module identifies the related term by any feasible technique. In one embodiment, the query management module compute an embedding value (e.g., a floating point value) based on one or more terms in the natural language query 402. The embedding values are computed using any embedding function that produces an embedding value.

Figure 5:
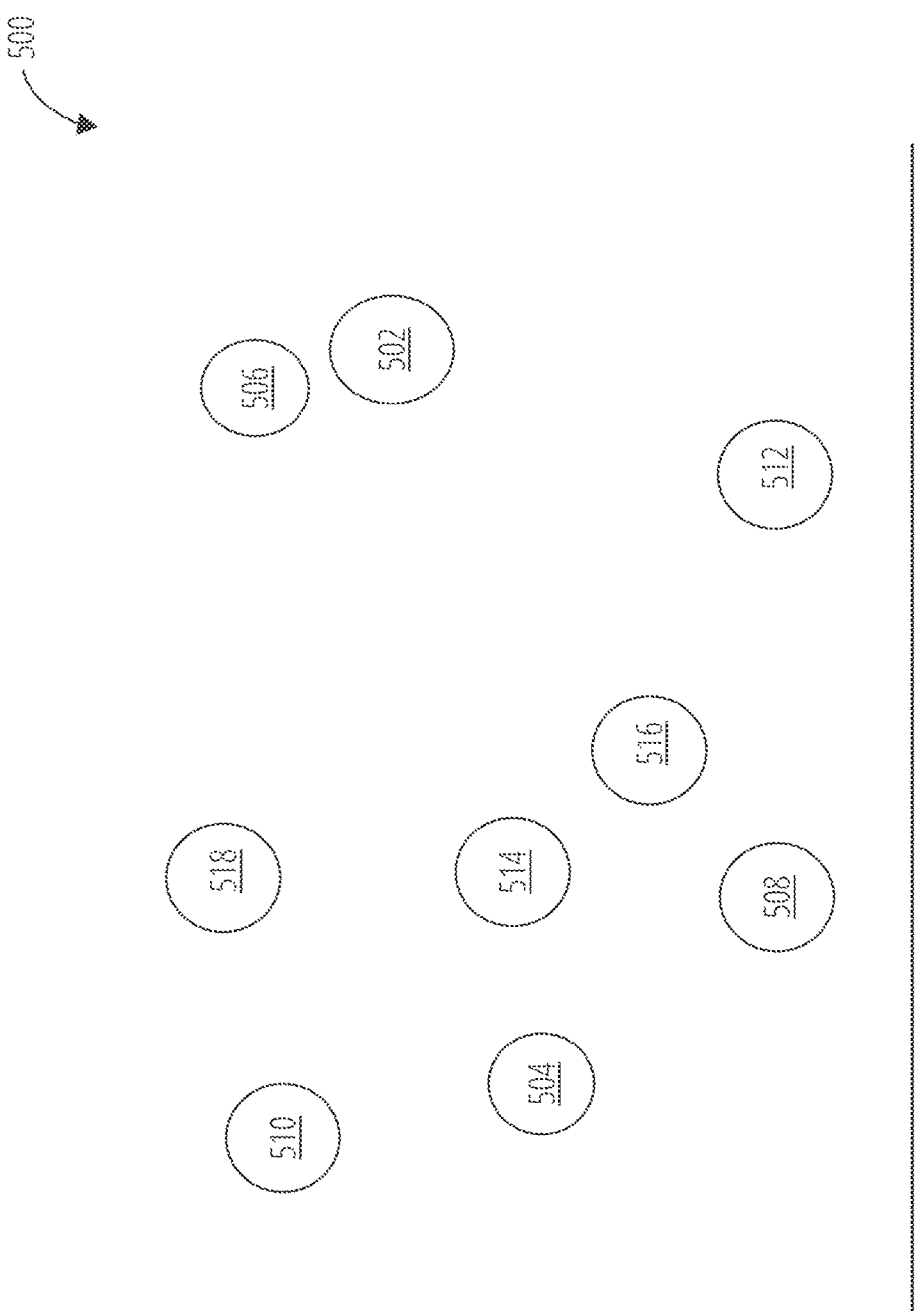
FIG. 5 illustrates an aspect of the subject matter in accordance with one embodiment.

FIG. 5 illustrates an example graph 500 of embeddings 504-518. The embeddings 504-518 are in an n-dimensional embedding space, where n is any positive integer greater than 1. As stated, the query management module may compute an embedding for one or more terms in the natural language query 402, which may be represented as embedding 502 in the graph 500. The query management module then compares the embedding(s) to other embeddings in the embedding space, e.g., embeddings 504-518. The embeddings 504-518 are associated with one or more terms or concepts. The query management module then selects an embedding from the embedding space that is most similar to the embedding(s) computed for the natural language query 402. In some embodiments, the similarity between embeddings is based on a respective distance between each of the embeddings 504-518 to the embedding 502 in the embedding space. In such an example, the embedding having the lowest distance to the computed embedding is selected. For example, in the embodiment depicted in FIG. 5, the embedding 506 is the most similar to the computed embedding 502, as the embedding 502 is nearest to embedding 506. The embedding 506 may be associated with a term "TEST HTTP destination." Example distances include Euclidean distances or cosine similarity (e.g., the cosine similarity of an angle between the vectors representing the embeddings).

Returning to FIG. 4, the user is prompted via natural language response 406 to re-run the query using the term "TEST HTTP destination" associated with embedding 506. The user then provides input specifying to re-run the query using the TEST HTTP destination parameter. The query management module causes the LLM to generate a modified graph query 408 based on the TEST HTTP destination parameter. The validation module validates the modified graph query 408 and the modified graph query 408 is executed against the knowledge graph 100. One or more results are returned based on the execution of the modified graph query 408 against the knowledge graph 100. A natural language response 410 is then returned to the user based on the results.

FIG. 6 illustrates an operating environment 600. The operating environment 600 comprises an example implementation for generating graph queries based on natural language input, according to one embodiment.

As shown, a client system 602 may be used to provide a query 604 to the query management module 606. In some embodiments, the client 602 is remote to a system hosting the query management module and other components of FIG. 6. In such embodiments, the query 604 is received via a communications network. In some embodiments, the query 604 is a natural language query (NLQ).

The query management module 606 receives the NLQ 604 and provides the NLQ 604 to the LLM 608. The query management module 606 also provides a context of the NLQ 604 to the LLM. The context may include a schema of one or more knowledge graphs 100 (which generally define entities, properties of entities, relationships, relationship properties, node types, edge (or relationship) types, etc.). As stated, in the knowledge graph 100, entities are represented by nodes, and the edges (which have directionality components) represent relationships between the entities connected via a given edge. The relationships are representative of any type of relationship (e.g., "has name," "is duplicate of", "has attribute", etc.). In some embodiments, relationships have multiple hops. For example, a first relationship specifies that a city is in a state and a second relationship specifies that a state is in a country. As such, a multiple hop relationship is that city is in the country. Embodiments are not limited in these contexts.

The LLM 608 then generates a graph query 610 based on the NLQ 604 and the context provided by the query management module 606. The LLM 608 is generally trained to generate graph queries such as graph query 610 (and graph queries 204, 304, and 404) based on natural language input, e.g., NLQ 604. The training of the LLM 608 generally includes determining the probability distributions of tokens (e.g., tokens extracted from training questions), where a token is one or more words. Doing so allows the LLM 608 to predict the most likely token in a sequence of tokens, outputting the token with the highest computed likelihood value.

However, even when trained, an LLM 608 may generate a query with one or more errors. Advantageously, embodiments disclosed herein prompt the LLM 608 to reproduce a query based on an identified error (and/or other metadata), which allows the LLM 608 to retrain or otherwise correct the errors, such that the same error is not reproduced in the future. The LLM 608 may be retrained based on one or more of the identified error and the other metadata (e.g., a context of the NLQ).

As shown, the validation module 612 validates the graph query 610 generated by the LLM 608. The validation module 612 may use one or more rules, heuristics, or other parameters to validate a given graph query. For example, by having access to (or otherwise storing) the schema of the knowledge graph 100, the validation module 612 can identify errors in the graph query 610 and cause the LLM 608 to regenerate the query based on the identified errors.

The validation module 612 is configured to identify any number and type of errors in a query. For example, the validation module 612 validates relationships in the graph query 610. Generally, the validation module 612 extracts relationships from the graph query 610 (e.g., by identifying syntax or other formatting associated with a relationship in the relevant graph query language). For example, the validation module 612 may extract an example relationship from graph query 610 specifying that a cat has a dog as a parent. The validation module 612 then determines whether the extracted relationship is present in the knowledge graph 100 based on a schema of the knowledge graph 100. In some embodiments, the validation module 612 queries the knowledge graph 100 to determine whether the extracted relationship exists in the knowledge graph 100. As another example, the validation module 612 may retrieve all relationships from the knowledge graph 100 and determine whether the extracted relationship exists in the retrieved relationships. If the extracted relationship is not in the knowledge graph 100, the validation module 612 identifies an error in the graph query 610. In such an example, the validation module 612 provides an indication of the identified error to the LLM 608 as part of a request to regenerate the graph query 610. In some embodiments, the validation module 612 provides additional context with the request to regenerate the graph query 610, e.g., the schema of the knowledge graph 100, the NLQ 604, the graph query 610, and an error message associated with the missing relationship (e.g., a message including an indication that the relationship was not identified in the knowledge graph). In some embodiments, a previous chat history between the user and the query management module 606 is also returned to the LLM 608.

As another example, the validation module 612 is configured to verify the direction of entity relationships in the knowledge graph 100. In such embodiments, the validation module 612 extracts the head and tail entities of the relationship from the graph query 610 based on the presence of syntax (e.g., a "→" in Cypher queries, etc.). The validation module 612 then pulls head and tail entities from all relationships in the knowledge graph 100 and determines whether a relationship has head and tail entities that match the extracted head and tail entities from the graph query 610. For example, if the head and tail entities extracted from graph query 610 are "movie" and "actor", the validation module 612 determines whether any relationships in the knowledge graph 100 has "movie" as a head entity and "actor" as a tail entity. If no match is found, the validation module 612 identifies an error in the query. In response, the validation module 612 requests that the LLM 608 regenerate the query. The validation module 612 may provide the schema of the knowledge graph 100, the NLQ 604, the graph query 610, and an error message associated with the improper relationship (e.g., an indication that there is no relationship from movie to actor). In some embodiments, the validation module 612 identifies an entity relationship in the knowledge graph 100 between the head and tail entities extracted from the graph query 610 (but in the correct order, e.g., actor as the head entity and movie as the tail entity). In such embodiments, the correct entity relationship is provided to the LLM 608 as part of a request to regenerate the graph query 610 using the accurate head/tail relationship. In some embodiments, a previous chat history between the user and the query management module 606 is also returned to the LLM 608.

The validation module 612 is further configured to validate entity properties (or attributes) in the graph query 610 relative to entity properties in the knowledge graph 100. For example, the validation module 612 parses the graph query 610 to identify each entity in the query and associated properties in the graph query 610. The validation module 612 then retrieves each property of each identified entity from the knowledge graph 100. The validation module 612 then compares the extracted entity properties from the graph query 610 to the entity properties received from the knowledge graph 100. If at least one extracted entity property does not match the entity properties received from the knowledge graph 100, the validation module 612 identifies an error. The validation module 612 then requests the LLM 608 to regenerate the graph query 610. As stated, the validation module 612 includes an indication of the error (e.g., that a given property from the graph query 610 is not present in the knowledge graph 100), the schema of the knowledge graph 100, the NLQ 604, and the graph query 610. In some embodiments, a previous chat history between the user and the query management module 606 is also returned to the LLM 608.

Once the validation module 612 processes the graph query 610, the validation module 612 returns, to the LLM 608 an indication of each identified error and the associated context (e.g., the schema of the knowledge graph 100, the NLQ 604, and the graph query 610). The LLM 608 may then generate a modified graph query, which is returned to the validation module 612 as another graph query 610. The validation module 612 then validates the modified graph query 610. If errors are detected in the modified graph query 610, the validation module 612 requests another modified query from the LLM 608 as described above. In some embodiments, however, the validation module 612 maintains a predetermined query modification threshold which sets a limit as to the number of times a graph query 610 can be regenerated by the LLM 608. For example, if the threshold is 3, the validation module 612 may request a modified graph query from the LLM 608 up to three times. However, the threshold is representative of any positive integer.

If no errors are detected in the modified graph query 610, the modified graph query 610 is executed against the knowledge graph 100 as validated query 616. A result set 618 is returned based on the execution of the validated query 616 against the knowledge graph 100. A natural language response 620 is then generated based on the result set 618. In some embodiments, the LLM 608 and/or a natural language generation component of the query management module 606 generates the natural language response 620. The natural language response 620 is then returned to the client 602 as responsive to the NLQ 604.

In some embodiments, the result set 618 is an empty set. In such an example, the validation module 612 processes the graph query 610 to determine that the graph query 610 has a "where" clause. In one embodiment, the "where" clause may be of the form "where=value". Based on the detection of the "where=" clause and the empty result set 618, the validation module 612 explores similar values using semantic similarity scores. For example, the validation module 612 computes an embedding value in an embedding space for the term "value" from the where clause. The validation module 612 then determines one or more similar terms in the embedding space based on the distance of the embedding for each term to the computed embedding value, where lower distance values indicate a stronger semantic relationship. The validation module 612 then identifies a candidate term that is most similar to the term from the graph query 610 (e.g., based on the embedding of the candidate term being nearest to the computed embedding value). Stated differently, the validation module 612 selects the candidate term based on the embedding of the candidate term having the lowest distance to the computed embedding value (relative to the other embeddings in the embedding space). Once the candidate term is selected, the user is prompted as to whether to re-run the query using the candidate term. If the user accepts the prompt, the LLM 608 generates another graph query 610 based on the candidate term. The validation module 612 may then validate the another graph query 610. If no errors exist, the another graph query 610 is executed against the knowledge graph 100 as validated query 616 to return a result set 618, and a natural language response 620 is returned based on the result set 618.

Figure 7:
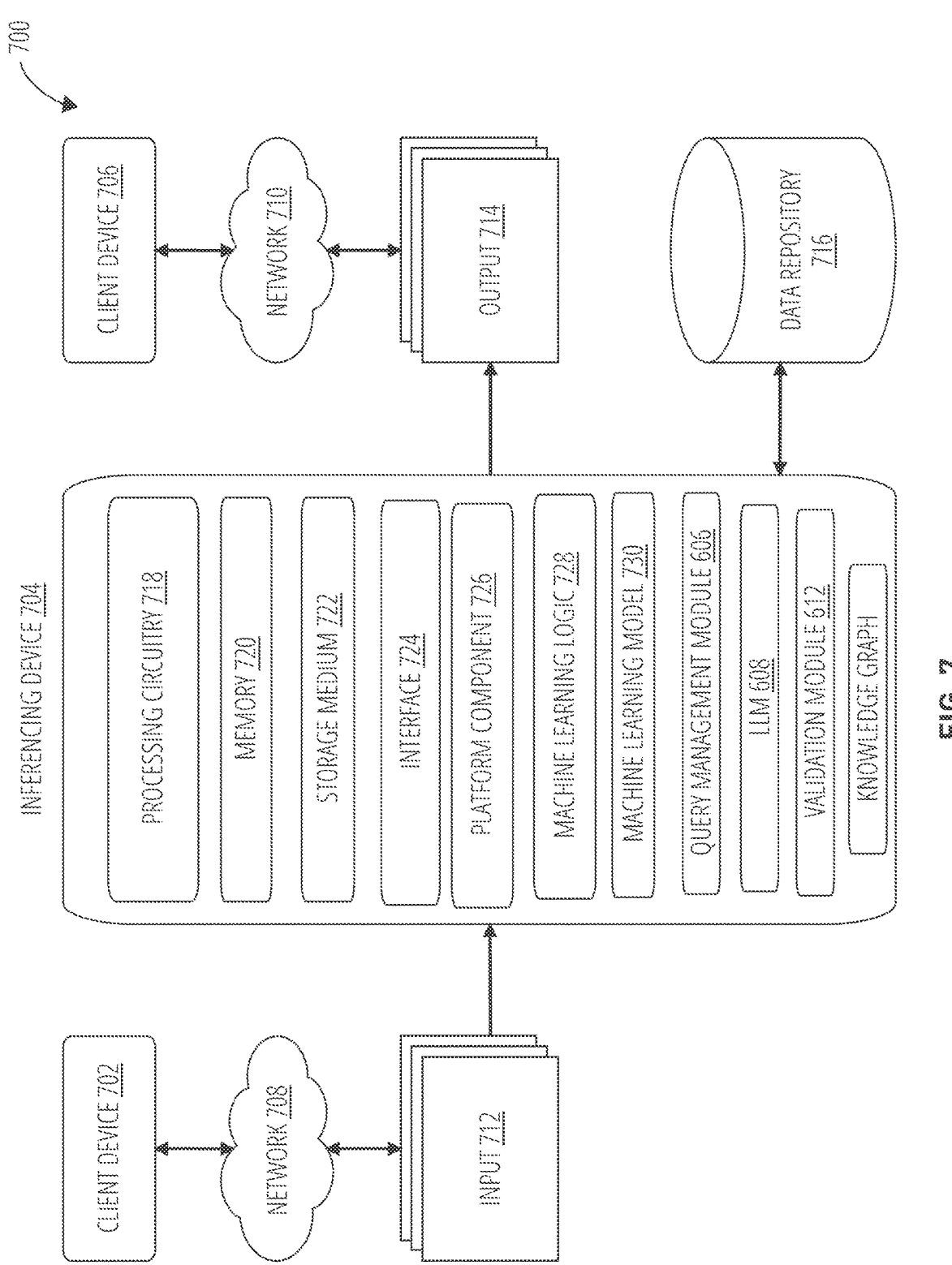
FIG. 7 illustrates a system 700 in accordance with one embodiment.

FIG. 7 illustrates an embodiment of a system 700. The system 700 is suitable for implementing one or more embodiments as described herein. In one embodiment, for example, the system 700 is an artificial intelligence (AI)/machine learning (ML) system suitable for generating graph queries based on natural language input.

The system 700 comprises a set of M devices, where M is any positive integer. FIG. 7 depicts three devices (M=3), including a client device 702, an inferencing device 704, and a client device 706. The inferencing device 704 communicates information with the client device 702 and the client device 706 over a network 708 and a network 710, respectively. The information may include input 712 from the client device 702 and output 714 to the client device 706, or vice-versa. In one alternative, the input 712 and the output 714 are communicated between the same client device 702 or client device 706. In another alternative, the input 712 and the output 714 are stored in a data repository 716. In yet another alternative, the input 712 and the output 714 are communicated via a platform component 726 of the inferencing device 704, such as an input/output (I/O) device (e.g., a touchscreen, a microphone, a speaker, etc.).

Figure 13:
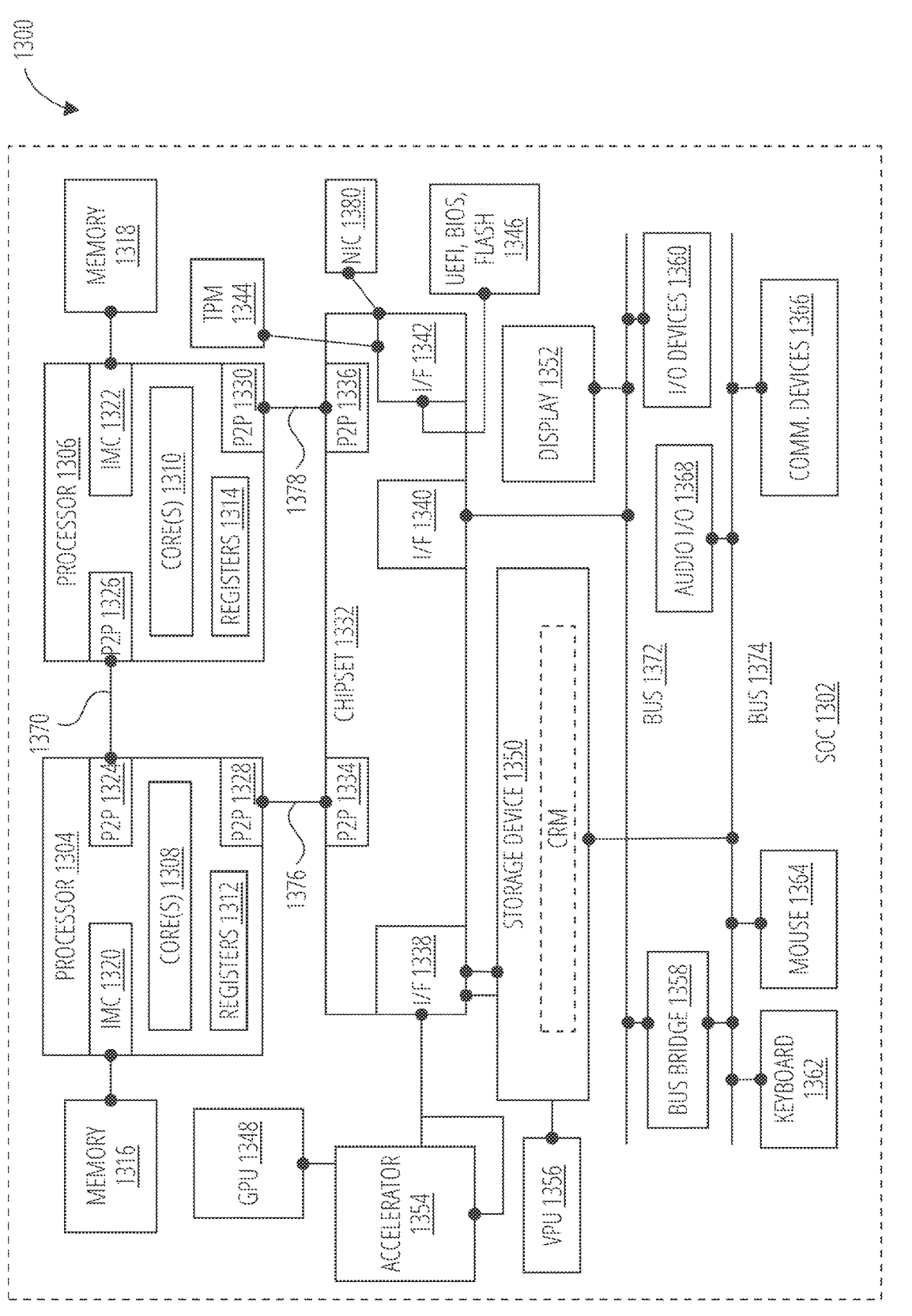
FIG. 13 illustrates a computing architecture 1300 in accordance with one embodiment.

As depicted in FIG. 7, the inferencing device 704 includes processing circuitry 718, a memory 720, a storage medium 722, an interface 724, a platform component 726, ML logic 728, an ML model 730, the query management module 606, the LLM 608, the validation module 612, and the knowledge graph 100. In some implementations, the inferencing device 704 includes other components or devices as well. Examples for software elements and hardware elements of the inferencing device 704 are described in more detail with reference to a computing architecture 1300 as depicted in FIG. 13. Embodiments are not limited to these examples.

Figure 14:
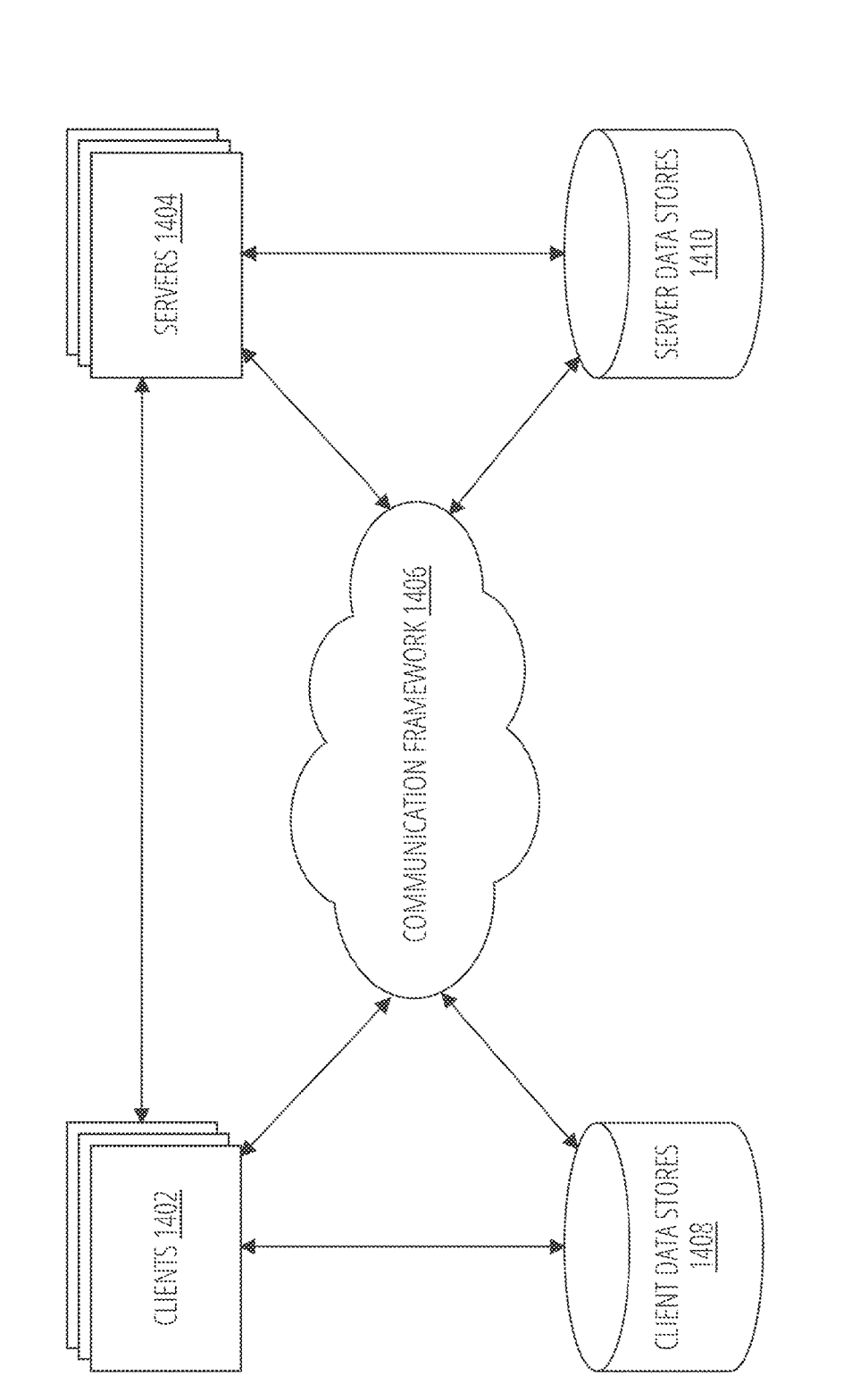
FIG. 14 illustrates a communications architecture 1400 in accordance with one embodiment.

The inferencing device 704 is generally arranged to receive an input 712, process the input 712 via one or more AI/ML techniques, and send an output 714. The inferencing device 704 receives the input 712 from the client device 702 via the network 708, the client device 706 via the network 710, the platform component 726 (e.g., a touchscreen as a text command or microphone as a voice command), the memory 720, the storage medium 722 or the data repository 716. The inferencing device 704 sends the output 714 to the client device 702 via the network 708, the client device 706 via the network 710, the platform component 726 (e.g., a touchscreen to present text, graphic or video information or speaker to reproduce audio information), the memory 720, the storage medium 722 or the data repository 716. Examples for the software elements and hardware elements of the network 708 and the network 710 are described in more detail with reference to a communications architecture 1400 as depicted in FIG. 14. Embodiments are not limited to these examples.

The inferencing device 704 includes ML logic 728 and an ML model 730 to implement various AI/ML techniques for various AI/ML tasks. The ML logic 728 receives the input 712, and processes the input 712 using the ML model 730. The ML model 730 performs inferencing operations to generate an inference for a specific task from the input 712. In some cases, the inference is part of the output 714. The output 714 is used by the client device 702, the inferencing device 704, or the client device 706 to perform subsequent actions in response to the output 714.

For example, the ML model 730 is representative of the LLM 608 in some embodiments. In such embodiments, the LLM 608 is trained to compute graph queries such as graph queries 204, 304, 404, 610, etc. The LLM 608 computes the graph queries based on a natural language query, a context of the query, and a schema of the knowledge graph 100. The validation module 612 validates a graph query generated by the LLM 608 as described herein. If the validation module 612 detects an error in the graph query, the validation module 612 automatically prompts the LLM 608 to regenerate the graph query as described herein. The LLM 608 then regenerates the graph query and learns from the errors identified by the validation module 612. Doing so causes the LLM 608 to refrain from reproducing the same and/or similar errors in generating other graph queries. Embodiments are not limited in these contexts.

In various embodiments, the ML model 730 is a trained ML model 730 using a set of training operations. An example of training operations to train the ML model 730 is described with reference to FIG. 8.

Figure 8:
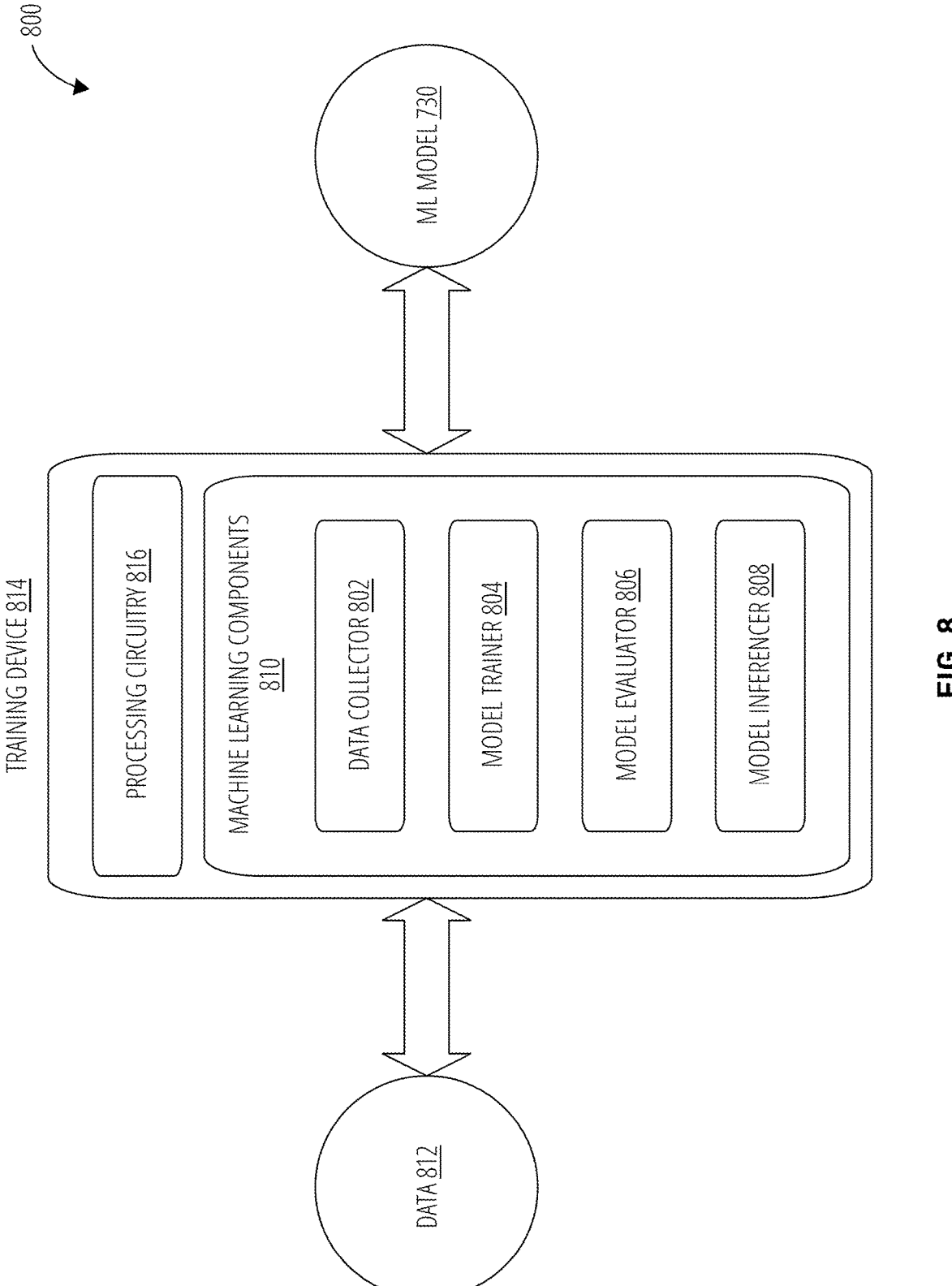
FIG. 8 illustrates an apparatus 800 in accordance with one embodiment.

FIG. 8 illustrates an apparatus 800. The apparatus 800 depicts a training device 814 suitable to generate a trained ML model 730 for the inferencing device 704 of the system 700. As depicted in FIG. 8, the training device 814 includes a processing circuitry 816 and a set of ML components 810 to support various AI/ML techniques, such as a data collector 802, a model trainer 804, a model evaluator 806 and a model inferencer 808.

In general, the data collector 802 collects data 812 from one or more data sources to use as training data for the ML model 730. The data collector 802 collects different types of data 812, such as text information, audio information, image information, video information, graphic information, knowledge graphs such as knowledge graph 100 and so forth. The model trainer 804 receives as input the collected data and uses a portion of the collected data as test data for an AI/ML algorithm to train the ML model 730. The model evaluator 806 evaluates and improves the trained ML model 730 using a portion of the collected data as test data to test the ML model 730. The model evaluator 806 also uses feedback information from the deployed ML model 730. The model inferencer 808 implements the trained ML model 730 to receive as input new unseen data, generate one or more inferences on the new data, and output a result such as an alert, a recommendation or other post-solution activity.

An exemplary AI/ML architecture for the ML components 810 is described in more detail with reference to FIG. 9.

Figure 9:
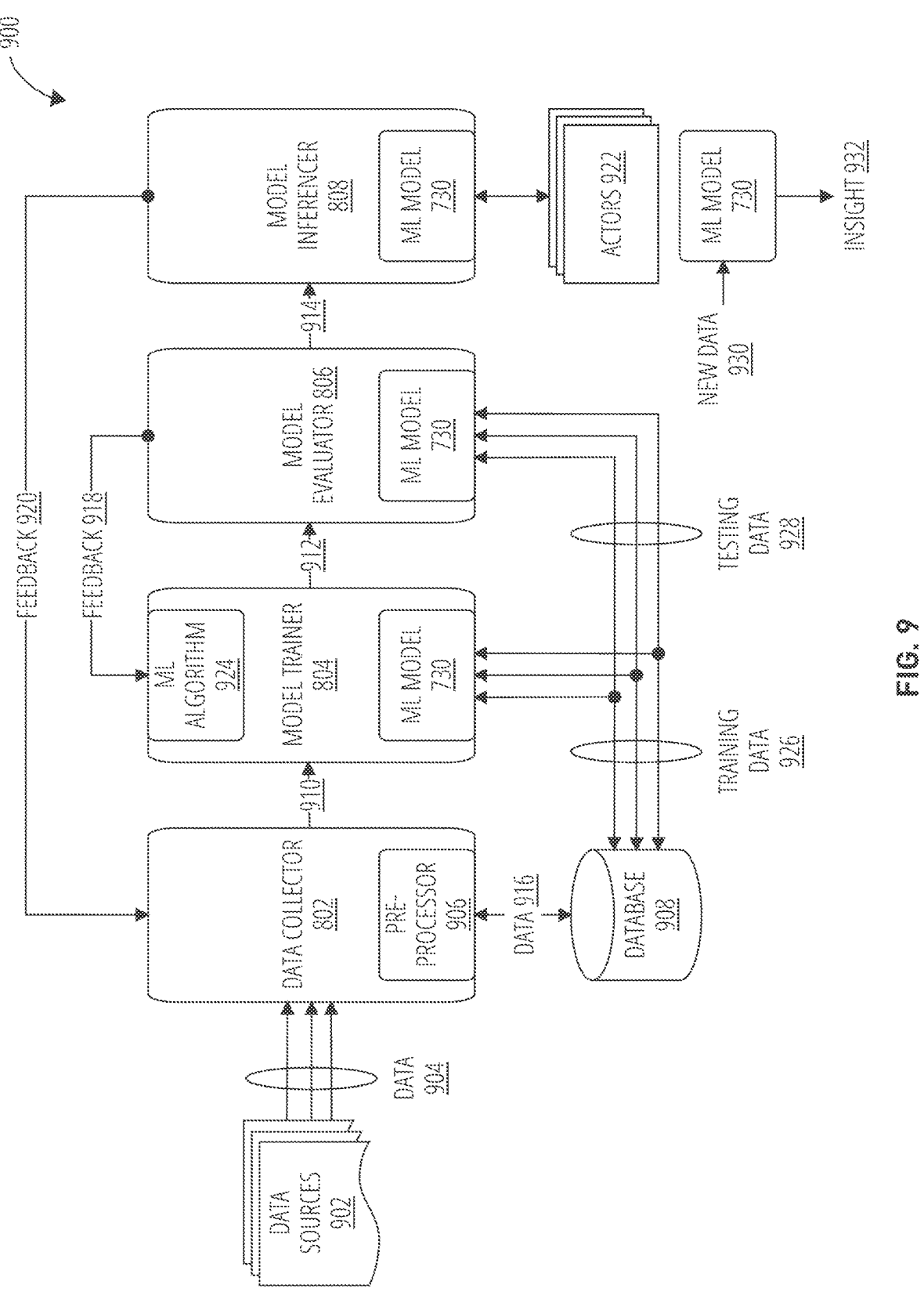
FIG. 9 illustrates an artificial intelligence architecture 900 in accordance with one embodiment.

FIG. 9 illustrates an artificial intelligence architecture 900 suitable for use by the training device 814 to generate the ML model 730 for deployment by the inferencing device 704. The artificial intelligence architecture 900 is an example of a system suitable for implementing various AI techniques and/or ML techniques to perform various inferencing tasks on behalf of the various devices of the system 700.

AI is a science and technology based on principles of cognitive science, computer science and other related disciplines, which deals with the creation of intelligent machines that work and react like humans. AI is used to develop systems that can perform tasks that require human intelligence such as recognizing speech, vision and making decisions. AI can be seen as the ability for a machine or computer to think and learn, rather than just following instructions. ML is a subset of AI that uses algorithms to enable machines to learn from existing data and generate insights or predictions from that data. ML algorithms are used to optimize machine performance in various tasks such as classifying, clustering and forecasting. ML algorithms are used to create ML models that can accurately predict outcomes.

In general, the artificial intelligence architecture 900 includes various machine or computer components (e.g., circuit, processor circuit, memory, network interfaces, compute platforms, input/output (I/O) devices, etc.) for an AI/ML system that are designed to work together to create a pipeline that can take in raw data, process it, train an ML model 730, evaluate performance of the trained ML model 730, and deploy the tested ML model 730 as the trained ML model 730 in a production environment, and continuously monitor and maintain it.

The ML model 730 is a mathematical construct used to predict outcomes based on a set of input data. The ML model 730 is trained using large volumes of training data 926, and it can recognize patterns and trends in the training data 926 to make accurate predictions. The ML model 730 is derived from an ML algorithm 924 (e.g., a neural network, decision tree, support vector machine, etc.). A data set is fed into the ML algorithm 924 which trains an ML model 730 to "learn" a function that produces mappings between a set of inputs and a set of outputs with a reasonably high accuracy. Given a sufficiently large enough set of inputs and outputs, the ML algorithm 924 finds the function for a given task. This function may even be able to produce the correct output for input that it has not seen during training. A data scientist prepares the mappings, selects and tunes the ML algorithm 924, and evaluates the resulting model performance. Once the ML logic 728 is sufficiently accurate on test data, it can be deployed for production use.

The ML algorithm 924 may comprise any ML algorithm suitable for a given AI task. Examples of ML algorithms may include supervised algorithms, unsupervised algorithms, or semi-supervised algorithms.

A supervised algorithm is a type of machine learning algorithm that uses labeled data to train a machine learning model. In supervised learning, the machine learning algorithm is given a set of input data and corresponding output data, which are used to train the model to make predictions or classifications. The input data is also known as the features, and the output data is known as the target or label. The goal of a supervised algorithm is to learn the relationship between the input features and the target labels, so that it can make accurate predictions or classifications for new, unseen data. Examples of supervised learning algorithms include: (1) linear regression which is a regression algorithm used to predict continuous numeric values, such as stock prices or temperature; (2) logistic regression which is a classification algorithm used to predict binary outcomes, such as whether a customer will purchase or not purchase a product; (3) decision tree which is a classification algorithm used to predict categorical outcomes by creating a decision tree based on the input features; or (4) random forest which is an ensemble algorithm that combines multiple decision trees to make more accurate predictions.

An unsupervised algorithm is a type of machine learning algorithm that is used to find patterns and relationships in a dataset without the need for labeled data. Unlike supervised learning, where the algorithm is provided with labeled training data and learns to make predictions based on that data, unsupervised learning works with unlabeled data and seeks to identify underlying structures or patterns. Unsupervised learning algorithms use a variety of techniques to discover patterns in the data, such as clustering, anomaly detection, and dimensionality reduction. Clustering algorithms group similar data points together, while anomaly detection algorithms identify unusual or unexpected data points. Dimensionality reduction algorithms are used to reduce the number of features in a dataset, making it easier to analyze and visualize. Unsupervised learning has many applications, such as in data mining, pattern recognition, and recommendation systems. It is particularly useful for tasks where labeled data is scarce or difficult to obtain, and where the goal is to gain insights and understanding from the data itself rather than to make predictions based on it.

Semi-supervised learning is a type of machine learning algorithm that combines both labeled and unlabeled data to improve the accuracy of predictions or classifications. In this approach, the algorithm is trained on a small amount of labeled data and a much larger amount of unlabeled data. The main idea behind semi-supervised learning is that labeled data is often scarce and expensive to obtain, whereas unlabeled data is abundant and easy to collect. By leveraging both types of data, semi-supervised learning can achieve higher accuracy and better generalization than either supervised or unsupervised learning alone. In semi-supervised learning, the algorithm first uses the labeled data to learn the underlying structure of the problem. It then uses this knowledge to identify patterns and relationships in the unlabeled data, and to make predictions or classifications based on these patterns. Semi-supervised learning has many applications, such as in speech recognition, natural language processing, and computer vision. It is particularly useful for tasks where labeled data is expensive or time-consuming to obtain, and where the goal is to improve the accuracy of predictions or classifications by leveraging large amounts of unlabeled data.

The ML algorithm 924 of the artificial intelligence architecture 900 is implemented using various types of ML algorithms including supervised algorithms, unsupervised algorithms, semi-supervised algorithms, or a combination thereof. A few examples of ML algorithms include support vector machine (SVM), random forests, naive Bayes, K-means clustering, neural networks, and so forth. A SVM is an algorithm that can be used for both classification and regression problems. It works by finding an optimal hyperplane that maximizes the margin between the two classes. Random forests is a type of decision tree algorithm that is used to make predictions based on a set of randomly selected features. Naive Bayes is a probabilistic classifier that makes predictions based on the probability of certain events occurring. K-Means Clustering is an unsupervised learning algorithm that groups data points into clusters. Neural networks is a type of machine learning algorithm that is designed to mimic the behavior of neurons in the human brain. Other examples of ML algorithms include a support vector machine (SVM) algorithm, a random forest algorithm, a naive Bayes algorithm, a K-means clustering algorithm, a neural network algorithm, an artificial neural network (ANN) algorithm, a convolutional neural network (CNN) algorithm, a recurrent neural network (RNN) algorithm, a long short-term memory (LSTM) algorithm, a deep learning algorithm, a decision tree learning algorithm, a regression analysis algorithm, a Bayesian network algorithm, a genetic algorithm, a federated learning algorithm, a distributed artificial intelligence algorithm, and so forth. Embodiments are not limited in this context.

As depicted in FIG. 9, the artificial intelligence architecture 900 includes a set of data sources 902 to source data 904 for the artificial intelligence architecture 900. Data sources 902 may comprise any device capable generating, processing, storing or managing data 904 suitable for a ML system. Examples of data sources 902 include without limitation databases, web scraping, sensors and Internet of Things (IoT) devices, image and video cameras, audio devices, text generators, publicly available databases, private databases, and many other data sources 902. The data sources 902 may be remote from the artificial intelligence architecture 900 and accessed via a network, local to the artificial intelligence architecture 900 an accessed via a network interface, or may be a combination of local and remote data sources 902.

The data sources 902 source difference types of data 904. By way of example and not limitation, the data 904 includes structured data from relational databases, such as customer profiles, transaction histories, or product inventories. The data 904 includes unstructured data from websites such as customer reviews, news articles, social media posts, or product specifications. The data 904 includes data from temperature sensors, motion detectors, and smart home appliances. The data 904 includes image data from medical images, security footage, or satellite images. The data 904 includes audio data from speech recognition, music recognition, or call centers. The data 904 includes text data from emails, chat logs, customer feedback, news articles or social media posts. The data 904 includes publicly available datasets such as those from government agencies, academic institutions, or research organizations. These are just a few examples of the many sources of data that can be used for ML systems. It is important to note that the quality and quantity of the data is critical for the success of a machine learning project.

The data 904 is typically in different formats such as structured, unstructured or semi-structured data. Structured data refers to data that is organized in a specific format or schema, such as tables or spreadsheets. Structured data has a well-defined set of rules that dictate how the data should be organized and represented, including the data types and relationships between data elements. Unstructured data refers to any data that does not have a predefined or organized format or schema. Unlike structured data, which is organized in a specific way, unstructured data can take various forms, such as text, images, audio, or video. Unstructured data can come from a variety of sources, including social media, emails, sensor data, and website content. Semi-structured data is a type of data that does not fit neatly into the traditional categories of structured and unstructured data. It has some structure but does not conform to the rigid structure of a traditional relational database. Semi-structured data is characterized by the presence of tags or metadata that provide some structure and context for the data.

The data sources 902 are communicatively coupled to a data collector 802. The data collector 802 gathers relevant data 904 from the data sources 902. Once collected, the data collector 802 may use a pre-processor 906 to make the data 904 suitable for analysis. This involves data cleaning, transformation, and feature engineering. Data preprocessing is a critical step in ML as it directly impacts the accuracy and effectiveness of the ML model 730. The pre-processor 906 receives the data 904 as input, processes the data 904, and outputs pre-processed data 916 for storage in a database 908. Examples for the database 908 includes a hard drive, solid state storage, and/or random access memory (RAM).

The data collector 802 is communicatively coupled to a model trainer 804. The model trainer 804 performs AI/ML model training, validation, and testing which may generate model performance metrics as part of the model testing procedure. The model trainer 804 receives the pre-processed data 916 as input 910 or via the database 908. The model trainer 804 implements a suitable ML algorithm 924 to train an ML model 730 on a set of training data 926 from the pre-processed data 916. The training data 926 may include one or more knowledge graphs 100 one or more natural language queries, and/or one or more graph queries generated based on the natural language queries and the knowledge graphs 100. The training process involves feeding the pre-processed data 916 into the ML algorithm 924 to produce or optimize an ML model 730. The training process adjusts its parameters until it achieves an initial level of satisfactory performance.

The model trainer 804 is communicatively coupled to a model evaluator 806. After an ML model 730 is trained, the ML model 730 needs to be evaluated to assess its performance. This is done using various metrics such as accuracy, precision, recall, and F1 score. The model trainer 804 outputs the ML model 730, which is received as input 910 or from the database 908. The model evaluator 806 receives the ML model 730 as input 912, and it initiates an evaluation process to measure performance of the ML model 730. The evaluation process includes providing feedback 918 to the model trainer 804. The model trainer 804 re-trains the ML model 730 to improve performance in an iterative manner.

The model evaluator 806 is communicatively coupled to a model inferencer 808. The model inferencer 808 provides AI/ML model inference output (e.g., inferences, predictions or decisions). Once the ML model 730 is trained and evaluated, it is deployed in a production environment where it is used to make predictions on new data. The model inferencer 808 receives the evaluated ML model 730 as input 914. The model inferencer 808 uses the evaluated ML model 730 to produce insights or predictions on real data, which is deployed as a final production ML model 730. The inference output of the ML model 730 is use case specific. The model inferencer 808 also performs model monitoring and maintenance, which involves continuously monitoring performance of the ML model 730 in the production environment and making any necessary updates or modifications to maintain its accuracy and effectiveness. The model inferencer 808 provides feedback 918 to the data collector 802 to train or re-train the ML model 730. The feedback 918 includes model performance feedback information, which is used for monitoring and improving performance of the ML model 730.

Some or all of the model inferencer 808 is implemented by various actors 922 in the artificial intelligence architecture 900, including the ML model 730 of the inferencing device 704, for example. The actors 922 use the deployed ML model 730 on new data to make inferences or predictions for a given task, and output an insight 932. The actors 922 implement the model inferencer 808 locally, or remotely receives outputs from the model inferencer 808 in a distributed computing manner. The actors 922 trigger actions directed to other entities or to itself. The actors 922 provide feedback 920 to the data collector 802 via the model inferencer 808. The feedback 920 comprise data needed to derive training data, inference data or to monitor the performance of the ML model 730 and its impact to the network through updating of key performance indicators (KPIs) and performance counters.

As previously described, the systems 700, 800 implement some or all of the artificial intelligence architecture 900 to support various use cases and solutions for various AI/ML tasks. In various embodiments, the training device 814 of the apparatus 800 uses the artificial intelligence architecture 900 to generate and train the ML model 730 for use by the inferencing device 704 for the system 700. In one embodiment, for example, the training device 814 may train the ML model 730 as a neural network, as described in more detail with reference to FIG. 10. Other use cases and solutions for AI/ML are possible as well, and embodiments are not limited in this context.

Figure 10:
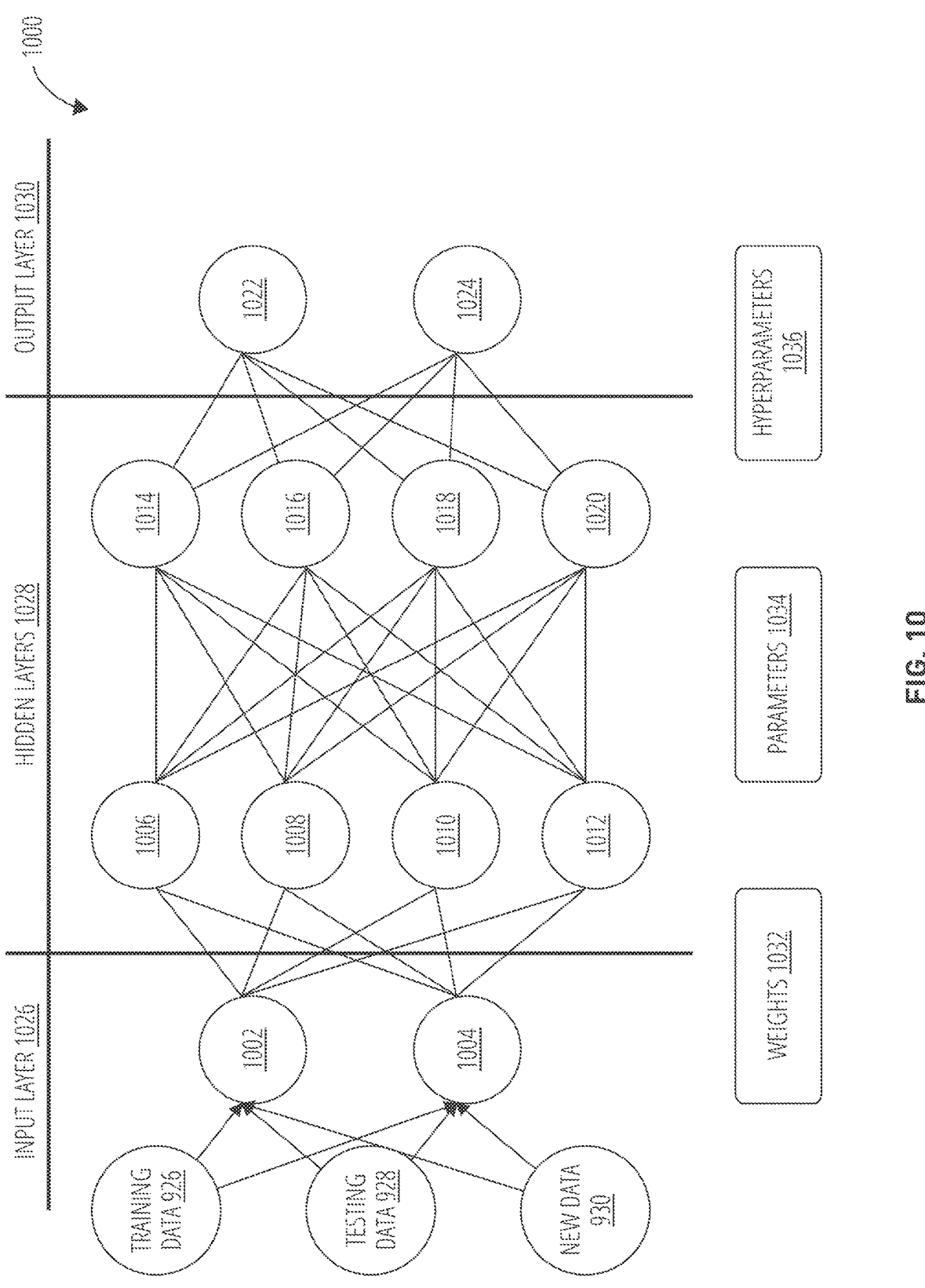
FIG. 10 illustrates an artificial neural network 1000 in accordance with one embodiment.

FIG. 10 illustrates an embodiment of an artificial neural network 1000. Neural networks, also known as artificial neural networks (ANNs) or simulated neural networks (SNNs), are a subset of machine learning and are at the core of deep learning algorithms. Their name and structure are inspired by the human brain, mimicking the way that biological neurons signal to one another. The artificial neural network 1000 is representative of the LLM 608.

Artificial neural network 1000 comprises multiple node layers, containing an input layer 1026, one or more hidden layers 1028, and an output layer 1030. Each layer comprises one or more nodes, such as nodes 1002 to 1024. As depicted in FIG. 10, for example, the input layer 1026 has nodes 1002, 1004. The artificial neural network 1000 has two hidden layers 1028, with a first hidden layer having nodes 1006, 1008, 1010 and 1012, and a second hidden layer having nodes 1014, 1016, 1018 and 1020. The artificial neural network 1000 has an output layer 1030 with nodes

1022, 1024. Each node 1002 to 1024 comprises a processing element (PE), or artificial neuron, that connects to another and has an associated weight and threshold. If the output of any individual node is above the specified threshold value, that node is activated, sending data to the next layer of the network. Otherwise, no data is passed along to the next layer of the network.

In general, artificial neural network 1000 relies on training data 926 to learn and improve accuracy over time. However, once the artificial neural network 1000 is fine-tuned for accuracy, and tested on testing data 928, the artificial neural network 1000 is ready to classify and cluster new data 930 at a high velocity. Tasks in speech recognition or image recognition can take minutes versus hours when compared to the manual identification by human experts.

Each individual node 1002 to 424 is a linear regression model, composed of input data, weights, a bias (or threshold), and an output. The linear regression model may have a formula similar to Equation (1), as follows:

$$\sum wixi + \text{bias} = w1x1 + w2x2 + w3x3 + \text{bias} \qquad \text{EQUATION (1)}$$

$$\text{output} = f(x) = 1 \text{ if } \sum w1x1 + b \geq 0; 0 \text{ if } \sum w1x1 + b < 0$$

Once an input layer 1026 is determined, a set of weights 1032 are assigned. The weights 1032 help determine the importance of any given variable, with larger ones contributing more significantly to the output compared to other inputs. All inputs are then multiplied by their respective weights and then summed. Afterward, the output is passed through an activation function, which determines the output. If that output exceeds a given threshold, it "fires" (or activates) the node, passing data to the next layer in the network. This results in the output of one node becoming in the input of the next node. The process of passing data from one layer to the next layer defines the artificial neural network 1000 as a feedforward network.

In one embodiment, the artificial neural network 1000 leverages sigmoid neurons, which are distinguished by having values between 0 and 1. Since the artificial neural network 1000 behaves similarly to a decision tree, cascading data from one node to another, having x values between 0 and 1 will reduce the impact of any given change of a single variable on the output of any given node, and subsequently, the output of the artificial neural network 1000.

The artificial neural network 1000 has many practical use cases, like image recognition, speech recognition, text recognition or classification. The artificial neural network 1000 leverages supervised learning, or labeled datasets, to train the algorithm. As the model is trained, its accuracy is measured using a cost (or loss) function. This is also commonly referred to as the mean squared error (MSE). An example of a cost function is shown in Equation (2), as follows:

$$\text{Cost Function} = MSE = \frac{1}{2m} \sum_{i=1}^{m} (\hat{y}_i - y_i)^2 \to \text{MIN} \qquad \text{EQUATION (2)}$$

Where i represents the index of the sample, y-hat is the predicted outcome, y is the actual value, and m is the number of samples.

Ultimately, the goal is to minimize the cost function to ensure correctness of fit for any given observation. As the model adjusts its weights and bias, it uses the cost function and reinforcement learning to reach the point of convergence, or the local minimum. The process in which the algorithm adjusts its weights is through gradient descent, allowing the model to determine the direction to take to reduce errors (or minimize the cost function). With each training example, the parameters 1034 of the model adjust to gradually converge at the minimum.

In one embodiment, the artificial neural network 1000 is feedforward, meaning it flows in one direction only, from input to output. In one embodiment, the artificial neural network 1000 uses backpropagation. Backpropagation is when the artificial neural network 1000 moves in the opposite direction from output to input. Backpropagation allows calculation and attribution of errors associated with each neuron 1002 to 1024, thereby allowing adjustment to fit the parameters 1034 of the ML model 730 appropriately. For example, in some embodiments, the LLM 608 may be retrained via backpropagation based on one or more errors in graph queries identified by the validation module 612. In such an example, the errors identified by the validation module 612, along with the other data provided by the validation module 612, are used to retrain the LLM 608. Embodiments are not limited in these contexts.

The artificial neural network 1000 is implemented as different neural networks depending on a given task. Neural networks are classified into different types, which are used for different purposes. In one embodiment, the artificial neural network 1000 is implemented as a feedforward neural network, or multi-layer perceptrons (MLPs), comprised of an input layer 1026, hidden layers 1028, and an output layer 1030. While these neural networks are also commonly referred to as MLPs, they are actually comprised of sigmoid neurons, not perceptrons, as most real-world problems are nonlinear. Trained data 904 usually is fed into these models to train them, and they are the foundation for computer vision, natural language processing, and other neural networks. In one embodiment, the artificial neural network 1000 is implemented as a convolutional neural network (CNN). A CNN is similar to feedforward networks, but usually utilized for image recognition, pattern recognition, and/or computer vision. These networks harness principles from linear algebra, particularly matrix multiplication, to identify patterns within an image. In one embodiment, the artificial neural network 1000 is implemented as a recurrent neural network (RNN). A RNN is identified by feedback loops. The RNN learning algorithms are primarily leveraged when using time-series data to make predictions about future outcomes, such as stock market predictions or sales forecasting. The artificial neural network 1000 is implemented as any type of neural network suitable for a given operational task of system 700, and the MLP, CNN, and RNN are merely a few examples. Embodiments are not limited in this context.

The artificial neural network 1000 includes a set of associated parameters 1034. There are a number of different parameters that must be decided upon when designing a neural network. Among these parameters are the number of layers, the number of neurons per layer, the number of training iterations, and so forth. Some of the more important parameters in terms of training and network capacity are a number of hidden neurons parameter, a learning rate parameter, a momentum parameter, a training type parameter, an Epoch parameter, a minimum error parameter, and so forth.

In some cases, the artificial neural network 1000 is implemented as a deep learning neural network. The term deep learning neural network refers to a depth of layers in a given neural network. A neural network that has more than three layers—which would be inclusive of the inputs and the output—can be considered a deep learning algorithm. A neural network that only has two or three layers, however, may be referred to as a basic neural network. A deep learning neural network may tune and optimize one or more hyperparameters 1036. A hyperparameter is a parameter whose values are set before starting the model training process. Deep learning models, including convolutional neural network (CNN) and recurrent neural network (RNN) models can have anywhere from a few hyperparameters to a few hundred hyperparameters. The values specified for these hyperparameters impacts the model learning rate and other regulations during the training process as well as final model performance. A deep learning neural network uses hyperparameter optimization algorithms to automatically optimize models. The algorithms used include Random Search, Tree-structured Parzen Estimator (TPE) and Bayesian optimization based on the Gaussian process. These algorithms are combined with a distributed training engine for quick parallel searching of the optimal hyperparameter values.

For example, the artificial neural network 1000 is representative of the LLM 608 in some embodiments. In such embodiments, the LLM 608 is trained to compute graph queries such as graph queries 204, 304, 404, 610, etc. The LLM 608 computes the graph queries based on a natural language query, a context of the query, and a schema of the knowledge graph 100. The validation module 612 validates a graph query generated by the LLM 608 as described herein. If the validation module 612 detects an error in the graph query, the validation module 612 automatically prompts the LLM 608 to regenerate the graph query as described herein. The LLM 608 then regenerates the graph query and learns from the errors identified by the validation module 612. Doing so reconfigures or otherwise retrains the LLM 608 to refrain from reproducing the same and/or similar errors in generating other graph queries. The reconfiguration and/or retraining may proceed as described herein, e.g., with reference to FIG. 10. Embodiments are not limited in these contexts.

Operations for the disclosed embodiments are further described with reference to the following figures. Some of the figures include a logic flow. Although such figures presented herein include a particular logic flow, the logic flow merely provides an example of how the general functionality as described herein is implemented. Further, a given logic flow does not necessarily have to be executed in the order presented unless otherwise indicated. Moreover, not all acts illustrated in a logic flow are required in some embodiments. In addition, the given logic flow is implemented by a hardware element, a software element executed by one or more processing devices, or any combination thereof. The embodiments are not limited in this context.

FIG. 11 illustrates an embodiment of a logic flow 1100. The logic flow 1100 is representative of some or all of the operations executed by one or more embodiments described herein. For example, the logic flow 1100 includes some or all of the operations performed by devices or entities within the system 700 or the apparatus 800. In one embodiment, the logic flow 1000 is implemented as instructions stored on a non-transitory computer-readable storage medium, such as the storage medium 722, that when executed by the processing circuitry 718 causes the processing circuitry 718 to perform the described operations. The storage medium 722 and processing circuitry 718 may be co-located, or the instructions may be stored remotely from the processing circuitry 718. Collectively, the storage medium 722 and the processing circuitry 718 may form a system.

In block 1102, logic flow 1100 receives, by a query management module such as query management module 606 executing on a processor such as processing circuitry 718 from a large language model (LLM) such as LLM 608, a graph query generated by the LLM based on a natural language query (NLQ). The graph query may target a knowledge graph such as knowledge graph 100. In block 1104, logic flow 1100 identifies, by a validation module such as validation module 612, an error in the graph query. In block 1106, logic flow 1100 provides, by the query management module, an indication of the error to the LLM. In block 1108, logic flow 1100 receives, by the query management module, a modified graph query from the LLM. In block 1110, logic flow 1100 validates, by the validation module, the modified graph query. In block 1112, logic flow 1100 executes, by the query management module, the modified graph query against knowledge graph 100 to return a result as a response to the NLQ.

Figure 12:
FIG. 12 illustrates a computer-readable storage medium 1202 in accordance with one embodiment.

FIG. 12 illustrates an apparatus 1200. Apparatus 1200 comprises any non-transitory computer-readable storage medium 1202 or machine-readable storage medium, such as an optical, magnetic or semiconductor storage medium. In various embodiments, apparatus 1200 comprises an article of manufacture or a product. In some embodiments, the computer-readable storage medium 1202 stores computer executable instructions with which one or more processing devices or processing circuitry can execute. For example, computer executable instructions 1204 includes instructions to implement operations described with respect to any logic flows described herein. As another example, computer executable instructions for LLM 508 1206 include instructions to implement the LLM 608. As another example, computer executable instructions for query management module 506 1208 include instructions to implement query management module 606. As another example, computer executable instructions for validation module 512 1210 include instructions to implement the validation module 612. Examples of computer-readable storage medium 1202 or machine-readable storage medium include any tangible media capable of storing electronic data, including volatile memory or non-volatile memory, removable or non-removable memory, erasable or non-erasable memory, writeable or re-writeable memory, and so forth. Examples of computer executable instructions 1204 include any suitable type of code, such as source code, compiled code, interpreted code, executable code, static code, dynamic code, object-oriented code, visual code, and the like.

FIG. 13 illustrates an embodiment of a computing architecture 1300. Computing architecture 1300 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the computing architecture 1300 has a single processor with one core or more than one processor. Note that the term "processor" refers to a processor with a single core or a processor package with multiple processor cores. In at least one embodiment, the computing architecture 1300 is representative of the components of the system 700, the apparatus 800, and/or the apparatus 1200. More generally, the computing architecture 1300 is configured to implement all logic, systems, logic flows, methods, apparatuses, and functionality described herein with reference to previous figures.

As used in this application, the terms "system" and "component" and "module" are intended to refer to a computer-related entity, either hardware, a combination of hardware and software, software, or software in execution, examples of which are provided by the exemplary computing architecture 1300. For example, a component is, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server are a component. One or more components reside within a process and/or thread of execution, and a component is localized on one computer and/or distributed between two or more computers. Further, components are communicatively coupled to each other by various types of communications media to coordinate operations. The coordination involves the unidirectional or bi-directional exchange of information. For instance, the components communicate information in the form of signals communicated over the communications media. The information is implemented as signals allocated to various signal lines. In such allocations, each message is a signal. Further embodiments, however, alternatively employ data messages. Such data messages may be sent across various connections. Exemplary connections include parallel interfaces, serial interfaces, and bus interfaces.

As shown in FIG. 13, computing architecture 1300 comprises a system-on-chip (SoC) 1302 for mounting platform components. System-on-chip (SoC) 1302 is a point-to-point (P2P) interconnect platform that includes a first processor 1304 and a second processor 1306 coupled via a point-to-point interconnect 1370 such as an Ultra Path Interconnect (UPI). In other embodiments, the computing architecture 1300 is another bus architecture, such as a multi-drop bus. Furthermore, each of processor 1304 and processor 1306 are processor packages with multiple processor cores including core(s) 1308 and core(s) 1310, respectively. While the computing architecture 1300 is an example of a two-socket (2S) platform, other embodiments include more than two sockets or one socket. For example, some embodiments include a four-socket (4S) platform or an eight-socket (8S) platform. Each socket is a mount for a processor and may have a socket identifier. Note that the term platform refers to a motherboard with certain components mounted such as the processor 1304 and chipset 1332. Some platforms include additional components and some platforms include sockets to mount the processors and/or the chipset. Furthermore, some platforms do not have sockets (e.g. SoC, or the like). Although depicted as a SoC 1302, one or more of the components of the SoC 1302 are included in a single die package, a multi-chip module (MCM), a multi-die package, a chiplet, a bridge, and/or an interposer. Therefore, embodiments are not limited to a SoC.

The processor 1304 and processor 1306 are any commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi-processor architectures are also employed as the processor 1304 and/or processor 1306. Additionally, the processor 1304 need not be identical to processor 1306.

Processor 1304 includes an integrated memory controller (IMC) 1320 and point-to-point (P2P) interface 1324 and P2P interface 1328. Similarly, the processor 1306 includes an IMC 1322 as well as P2P interface 1326 and P2P interface 1330. IMC 1320 and IMC 1322 couple the processor 1304 and processor 1306, respectively, to respective memories (e.g., memory 1316 and memory 1318). Memory 1316 and memory 1318 are portions of the main memory (e.g., a dynamic random-access memory (DRAM)) for the platform such as double data rate type 4 (DDR4) or type 5 (DDR5) synchronous DRAM (SDRAM). In the present embodiment, the memory 1316 and the memory 1318 locally attach to the respective processors (i.e., processor 1304 and processor 1306). In other embodiments, the main memory couple with the processors via a bus and shared memory hub. Processor 1304 includes registers 1312 and processor 1306 includes registers 1314.

Computing architecture 1300 includes chipset 1332 coupled to processor 1304 and processor 1306. Furthermore, chipset 1332 are coupled to storage device 1350, for example, via an interface (I/F) 1338. The I/F 1338 may be, for example, a Peripheral Component Interconnect-enhanced (PCIe) interface, a Compute Express Link® (CXL) interface, or a Universal Chiplet Interconnect Express (UCIe) interface. Storage device 1350 stores instructions executable by circuitry of computing architecture 1300 (e.g., processor 1304, processor 1306, GPU 1348, accelerator 1354, vision processing unit 1356, or the like). For example, storage device 1350 can store instructions for the client device 702, the client device 706, the inferencing device 704, the training device 814, or the like.

Processor 1304 couples to the chipset 1332 via P2P interface 1328 and P2P 1334 while processor 1306 couples to the chipset 1332 via P2P interface 1330 and P2P 1336. Direct media interface (DMI) 1376 and DMI 1378 couple the P2P interface 1328 and the P2P 1334 and the P2P interface 1330 and P2P 1336, respectively. DMI 1376 and DMI 1378 is a high-speed interconnect that facilitates, e.g., eight Giga Transfers per second (GT/s) such as DMI 3.0. In other embodiments, the processor 1304 and processor 1306 interconnect via a bus.

The chipset 1332 comprises a controller hub such as a platform controller hub (PCH). The chipset 1332 includes a system clock to perform clocking functions and include interfaces for an I/O bus such as a universal serial bus (USB), peripheral component interconnects (PCIs), CXL interconnects, UCIe interconnects, interface serial peripheral interconnects (SPIs), integrated interconnects (I2Cs), and the like, to facilitate connection of peripheral devices on the platform. In other embodiments, the chipset 1332 comprises more than one controller hub such as a chipset with a memory controller hub, a graphics controller hub, and an input/output (I/O) controller hub.

In the depicted example, chipset 1332 couples with a trusted platform module (TPM) 1344 and UEFI, BIOS, FLASH circuitry 1346 via I/F 1342. The TPM 1344 is a dedicated microcontroller designed to secure hardware by integrating cryptographic keys into devices. The UEFI, BIOS, FLASH circuitry 1346 may provide pre-boot code.

The I/F 1342 may also be coupled to a network interface circuit (NIC) 1380 for connections off-chip.

Furthermore, chipset 1332 includes the I/F 1338 to couple chipset 1332 with a high-performance graphics engine, such as, graphics processing circuitry or a graphics processing unit (GPU) 1348. In other embodiments, the computing architecture 1300 includes a flexible display interface (FDI) (not shown) between the processor 1304 and/or the processor 1306 and the chipset 1332. The FDI interconnects a graphics processor core in one or more of processor 1304 and/or processor 1306 with the chipset 1332.

The computing architecture 1300 is operable to communicate with wired and wireless devices or entities via the network interface (NIC) 1380 using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, 3G, 4G, LTE wireless technologies, among others. Thus, the communication is a predefined structure as with a conventional network or simply an ad hoc communication between at least two devices. Wi-Fi networks use radio technologies called IEEE 802.11x (a, b, g, n, ac, ax, etc.) to provide secure, reliable, fast wireless connectivity. A Wi-Fi network is used to connect computers to each other, to the Internet, and to wired networks (which use IEEE 802.3-related media and functions).

Additionally, accelerator 1354 and/or vision processing unit 1356 are coupled to chipset 1332 via I/F 1338. The accelerator 1354 is representative of any type of accelerator device (e.g., a data streaming accelerator, cryptographic accelerator, cryptographic co-processor, an offload engine, etc.). One example of an accelerator 1354 is the Intel® Data Streaming Accelerator (DSA). The accelerator 1354 is a device including circuitry to accelerate copy operations, data encryption, hash value computation, data comparison operations (including comparison of data in memory 1316 and/or memory 1318), and/or data compression. Examples for the accelerator 1354 include a USB device, PCI device, PCIe device, CXL device, UCIe device, and/or an SPI device. The accelerator 1354 also includes circuitry arranged to execute machine learning (ML) related operations (e.g., training, inference, etc.) for ML models. Generally, the accelerator 1354 is specially designed to perform computationally intensive operations, such as hash value computations, comparison operations, cryptographic operations, and/or compression operations, in a manner that is more efficient than when performed by the processor 1304 or processor 1306. Because the load of the computing architecture 1300 includes hash value computations, comparison operations, cryptographic operations, and/or compression operations, the accelerator 1354 greatly increases performance of the computing architecture 1300 for these operations.

The accelerator 1354 includes one or more dedicated work queues and one or more shared work queues (each not pictured). Generally, a shared work queue is configured to store descriptors submitted by multiple software entities. The software is any type of executable code, such as a process, a thread, an application, a virtual machine, a container, a microservice, etc., that share the accelerator 1354. For example, the accelerator 1354 is shared according to the Single Root I/O virtualization (SR-IOV) architecture and/or the Scalable I/O virtualization (S-IOV) architecture. Embodiments are not limited in these contexts. In some embodiments, software uses an instruction to atomically submit the descriptor to the accelerator 1354 via a non-posted write (e.g., a deferred memory write (DMWr)). One example of an instruction that atomically submits a work descriptor to the shared work queue of the accelerator 1354 is the ENQCMD command or instruction (which may be referred to as "ENQCMD" herein) supported by the Intel® Instruction Set Architecture (ISA). However, any instruction having a descriptor that includes indications of the operation to be performed, a source virtual address for the descriptor, a destination virtual address for a device-specific register of the shared work queue, virtual addresses of parameters, a virtual address of a completion record, and an identifier of an address space of the submitting process is representative of an instruction that atomically submits a work descriptor to the shared work queue of the accelerator 1354. The dedicated work queue may accept job submissions via commands such as the movdir64b instruction.

Various I/O devices 1360 and display 1352 couple to the bus 1372, along with a bus bridge 1358 which couples the bus 1372 to a second bus 1374 and an I/F 1340 that connects the bus 1372 with the chipset 1332. In one embodiment, the second bus 1374 is a low pin count (LPC) bus. Various input/output (I/O) devices couple to the second bus 1374 including, for example, a keyboard 1362, a mouse 1364 and communication devices 1366.

Furthermore, an audio I/O 1368 couples to second bus 1374. Many of the I/O devices 1360 and communication devices 1366 reside on the system-on-chip (SoC) 1302 while the keyboard 1362 and the mouse 1364 are add-on peripherals. In other embodiments, some or all the I/O devices 1360 and communication devices 1366 are add-on peripherals and do not reside on the system-on-chip (SoC) 1302.

FIG. 14 illustrates a block diagram of an exemplary communications architecture 1400 suitable for implementing various embodiments as previously described. The communications architecture 1400 includes various common communications elements, such as a transmitter, receiver, transceiver, radio, network interface, baseband processor, antenna, amplifiers, filters, power supplies, and so forth. The embodiments, however, are not limited to implementation by the communications architecture 1400.

As shown in FIG. 14, the communications architecture 1400 includes one or more clients 1402 and servers 1404. The clients 1402 and the servers 1404 are operatively connected to one or more respective client data stores 1408 and server data stores 1410 that can be employed to store information local to the respective clients 1402 and servers 1404, such as cookies and/or associated contextual information.

The clients 1402 and the servers 1404 communicate information between each other using a communication framework 1406. The communication framework 1406 implements any well-known communications techniques and protocols. The communication framework 1406 is implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communication framework 1406 implements various network interfaces arranged to accept, communicate, and connect to a communications network. A network interface is regarded as a specialized form of an input output interface. Network interfaces employ connection protocols including without limitation direct connect, Ethernet (e.g., thick, thin, twisted pair 10/700/1000 Base T, and the like), token ring, wireless network interfaces, cellular network interfaces, IEEE 802.11 network interfaces, IEEE 802.16 network interfaces, IEEE 802.20 network interfaces, and the like. Further, multiple network interfaces are used to engage with various communications network types. For example, multiple network interfaces are employed to allow for the communication over broadcast, multicast, and unicast networks. Should processing requirements dictate a greater amount speed and capacity, distributed network controller architectures are similarly employed to pool, load balance, and otherwise increase the communicative bandwidth required by clients 1402 and the servers 1404. A communications network is any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The various elements of the devices as previously described with reference to the figures include various hardware elements, software elements, or a combination of both. Examples of hardware elements include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements varies in accordance with any number of factors, such as desired computational rate, power levels, heat tolerances, processing cycle budget, input data rates, output data rates, memory resources, data bus speeds and other design or performance constraints, as desired for a given implementation.

One or more aspects of at least one embodiment are implemented by representative instructions stored on a machine-readable medium which represents various logic within the processor, which when read by a machine causes the machine to fabricate logic to perform the techniques described herein. Such representations, known as "intellectual property (IP) cores" are stored on a tangible, machine readable medium and supplied to various customers or manufacturing facilities to load into the fabrication machines that make the logic or processor. Some embodiments are implemented, for example, using a machine-readable medium or article which may store an instruction or a set of instructions that, when executed by a machine, causes the machine to perform a method and/or operations in accordance with the embodiments. Such a machine includes, for example, any suitable processing platform, computing platform, computing device, processing device, computing system, processing system, processing devices, computer, processor, or the like, and is implemented using any suitable combination of hardware and/or software. The machine-readable medium or article includes, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions include any suitable type of code, such as source code, compiled code, interpreted code, executable code, static code, dynamic code, encrypted code, and the like, implemented using any suitable high-level, low-level, object-oriented, visual, compiled and/or interpreted programming language.

As utilized herein, terms "component," "system," "interface," and the like are intended to refer to a computer-related entity, hardware, software (e.g., in execution), and/or firmware. For example, a component is a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server is also a component. One or more components reside within a process, and a component is localized on one computer and/or distributed between two or more computers. A set of elements or a set of other components are described herein, in which the term "set" can be interpreted as "one or more."

Further, these components execute from various computer readable storage media having various data structures stored thereon such as with a module, for example. The components communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component is an apparatus with specific functionality provided by mechanical parts operated by electric or electronic circuitry, in which the electric or electronic circuitry is operated by a software application or a firmware application executed by one or more processors. The one or more processors are internal or external to the apparatus and execute at least a part of the software or firmware application. As yet another example, a component is an apparatus that provides specific functionality through electronic components without mechanical parts; the electronic components include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items may be distinct or they may be the same, although in some situations the context may indicate that they are distinct or that they are the same.

As used herein, the term "circuitry" may refer to, be part of, or include a circuit, an integrated circuit (IC), a monolithic IC, a discrete circuit, a hybrid integrated circuit (HIC), an Application Specific Integrated Circuit (ASIC), an electronic circuit, a logic circuit, a microcircuit, a hybrid circuit, a microchip, a chip, a chiplet, a chipset, a multi-chip module (MCM), a semiconductor die, a system on a chip (SoC), a processor (shared, dedicated, or group), a processor circuit, a processing circuit, or associated memory (shared, dedicated, or group) operably coupled to the circuitry that execute one or more software or firmware programs, a combinational logic circuit, or other suitable hardware components that provide the described functionality. In some embodiments, the circuitry is implemented in, or functions associated with the circuitry are implemented by, one or more software or firmware modules. In some embodiments, circuitry includes logic, at least partially operable in hardware. It is noted that hardware, firmware and/or software elements may be collectively or individually referred to herein as "logic" or "circuit."

Some embodiments are described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately can be employed in combination with each other unless it is noted that the features are incompatible with each other.

Some embodiments are presented in terms of program procedures executed on a computer or network of computers. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments are described using the expression "coupled" and "connected" along with their derivatives. These terms are not necessarily intended as synonyms for each other. For example, some embodiments are described using the terms "connected" and/or "coupled" to indicate that two or more elements are in direct physical or electrical contact with each other. The term "coupled," however, also means that two or more elements are not in direct contact with each other, but yet still co-operate or interact with each other.

Various embodiments also relate to apparatus or systems for performing these operations. This apparatus is specially constructed for the required purpose or it comprises a general purpose computer as selectively activated or reconfigured by a computer program stored in the computer. The procedures presented herein are not inherently related to a particular computer or other apparatus. Various general purpose machines are used with programs written in accordance with the teachings herein, or it proves convenient to construct more specialized apparatus to perform the required method steps. The required structure for a variety of these machines are apparent from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

The following examples pertain to further embodiments, from which numerous permutations and configurations will be apparent.

Example 1 includes a method, comprising: receiving, by a query management module executing on a processor from a large language model (LLM), a graph query generated by the LLM based on a natural language query (NLQ); identifying, by a validation module, an error in the graph query; providing, by the query management module, an indication of the error to the LLM; receiving, by the query management module, a modified graph query from the LLM; validating, by the validation module, the modified graph query; and executing, by the query management module based on the validation of the modified graph query, the modified graph query against a knowledge graph to return a result as a response to the NLQ.

Example 2 includes the subject matter of example 1, wherein identifying the error in the graph query comprises: extracting, by the validation module, a relationship between two entities from the graph query; and determining, by the validation module, that the relationship does not exist in the knowledge graph, wherein the indication of the error includes an indication that the relationship does not exist in the knowledge graph.

Example 3 includes the subject matter of example 1, wherein identifying the error in the graph query comprises: identifying, by the validation module, a property of an entity in the graph query; and determining, by the validation module, that the property of the entity does not exist in the knowledge graph, wherein the indication of the error includes an indication that the property of the entity does not exist in the knowledge graph.

Example 4 includes the subject matter of example 1, wherein identifying the error in the graph query comprises: identifying, by the validation module, a relationship between two entities in the graph query; receiving, by the validation module, a relationship between the two entities in the knowledge graph; and determining, by the validation module, that a direction of the relationship between the two entities in the graph query does not match a direction of the relationship between the two entities in the knowledge graph, wherein the indication of the error includes an indication that the direction of the relationship between the two entities in the graph query is incorrect.

Example 5 includes the subject matter of example 1, further comprising: determining, by the query management module, that the result is an empty set; determining, by the validation module, a property in the modified graph query; computing, by the validation module, an embedding for the property; selecting, by the validation module, an embedding for another property based on a similarity between the embedding for the property and the embedding for the another property; receiving, by the query management module from the LLM, another modified graph query based on the embedding for the another property; and executing, by the query management module, the another modified graph query against the knowledge graph to return another result as the response to the NLQ.

Example 6 includes the subject matter of example 1, further comprising prior to receiving the graph query: determining, by the query management module, a context of the NLQ; and requesting, by the query management module, the graph query from the LLM based on the NLQ and the context of the NLQ.

Example 7 includes the subject matter of example 1, further comprising: retraining the LLM based at least in part on the indication of the error.

Example 8 includes the subject matter of example 1, further comprising: receiving, by the query management module, a tuple as the result from the knowledge graph, wherein the tuple comprises a relationship between two entities; generating, by a natural language response module, a natural language response based on the tuple; and returning, by the query management module, the natural language response as the response to the NLQ.

Example 9 includes a system comprising: a memory component; and one or more processing devices coupled to the memory component, the one or more processing devices to perform operations comprising: receiving, by a query management module, a natural language query (NLQ); receiving, by the query management module from a large language model (LLM), a graph query generated by the LLM based on the NLQ; identifying, by a validation module, an error in the graph query; providing, by the query management module, an indication of the error to the LLM; receiving, by the query management module, a modified graph query from the LLM; validating, by the validation module, the modified graph query; and executing, by the query management module based on the validation of the modified graph query, the modified graph query against a knowledge graph to return a result as a response to the NLQ.

Example 10 includes the subject matter of example 9, wherein validating the modified graph query comprises one or more of: determining, by the validation module, that a property of an entity in the modified graph query exists in the knowledge graph; determining, by the validation module, that a relationship between two entities in the modified graph query exists in the knowledge graph; or determining, by the validation module, that a direction of the relationship between the two entities in the modified graph query matches a direction of a relationship between the two entities in the knowledge graph.

Example 11 includes the subject matter of example 9, wherein identifying the error in the graph query comprises: extracting, by the validation module, a relationship between two entities from the graph query; and determining, by the validation module, that the relationship does not exist in the knowledge graph, wherein the indication of the error includes an indication that the relationship does not exist in the knowledge graph.

Example 12 includes the subject matter of example 9, wherein identifying the error in the graph query comprises: identifying, by the validation module, a property of an entity in the graph query; and determining, by the validation module, that the property of the entity does not exist in the knowledge graph, wherein the indication of the error includes an indication that the property of the entity does not exist in the knowledge graph.

Example 13 includes the subject matter of example 9, wherein identifying the error in the graph query comprises: identifying, by the validation module, a relationship between two entities in the graph query; receiving, by the validation module, a relationship between the two entities in the knowledge graph; and determining, by the validation module, that a direction of the relationship between the two entities in the graph query does not match a direction of the relationship between the two entities in the knowledge graph, wherein the indication of the error includes an indication that the direction of the relationship between the two entities in the graph query is incorrect.

Example 14 includes the subject matter of example 9, the one or more processing devices to perform operations comprising: determining, by the query management module, that the result is an empty set; determining, by the validation module, a property in the modified graph query; computing, by the validation module, an embedding for the property; selecting, by the validation module, an embedding for another property based on a similarity between the embedding for the property and the embedding for the another property; receiving, by the query management module from the LLM, another modified graph query based on the embedding for the another property; and executing, by the query management module, the another modified graph query against the knowledge graph to return another result as the response to the NLQ.

Example 15 includes the subject matter of example 9, the one or more processing devices to perform operations comprising: receiving, by the query management module, a tuple as the result from the knowledge graph, wherein the tuple comprises a relationship between two entities; generating, by a natural language response module, a natural language response based on the tuple; and returning, by the query management module, the natural language response as the response to the NLQ.

Example 16 includes a non-transitory computer-readable medium storing executable instructions, which when executed by one or more processing devices, cause the one or more processing devices to perform operations comprising: receiving, by a query management module from a large language model (LLM), a graph query generated by the LLM based on a natural language query (NLQ); identifying, by a validation module, an error in the graph query; providing, by the query management module, an indication of the error to the LLM; receiving, by the query management module, a modified graph query from the LLM; validating, by the validation module, the modified graph query; executing, by the query management module based on the validation of the modified graph query, the modified graph query against a knowledge graph to receive a result; and returning, by a natural language response module, a natural language response based on the result as a response to the NLQ.

Example 17 includes the subject matter of example 16, wherein validating the modified graph query comprises one or more of: determining, by the validation module, that a property of an entity in the modified graph query exists in the knowledge graph; determining, by the validation module, that a relationship between two entities in the modified graph query exists in the knowledge graph; or determining, by the validation module, that a direction of the relationship between the two entities in the modified graph query matches a direction of a relationship between the two entities in the knowledge graph.

Example 18 includes the subject matter of example 16, wherein identifying the error in the graph query comprises: extracting, by the validation module, a relationship between two entities from the graph query; and determining, by the validation module, that the relationship does not exist in knowledge graph, wherein the indication of the error includes an indication that the relationship does not exist in the knowledge graph.

Example 19 includes the subject matter of example 16, wherein identifying the error in the graph query comprises: identifying, by the validation module, a property of an entity in the graph query; and determining, by the validation module, that the property of the entity does not exist in the knowledge graph, wherein the indication of the error includes an indication that the property of the entity does not exist in the knowledge graph.

Example 20 includes the subject matter of example 16, wherein identifying the error in the graph query comprises: identifying, by the validation module, a relationship between two entities in the graph query; receiving, by the validation module, a relationship between the two entities in the knowledge graph; and determining, by the validation module, that a direction of the relationship between the two entities in the graph query does not match a direction of the relationship between the two entities in the knowledge graph, wherein the indication of the error includes an indication that the direction of the relationship between the two entities in the graph query is incorrect.

Example 21 includes a system comprising: a memory component; and one or more processing devices coupled to the memory component, the one or more processing devices to perform operations comprising: receiving, by a large language model (LLM) from a query management module, an indication of an error in a graph query and a context of the graph query, the graph query generated by the LLM based on a natural language query (NLQ); generating, by the LLM, a modified graph query based on the indication of the error and the context of the graph query; and returning, by the LLM, the modified graph query to the query management module for execution against a knowledge graph.

Example 22 includes the subject matter of example 21, wherein the context of the graph query comprises the graph query, a schema of the knowledge graph, and the NLQ, wherein the LLM generates the modified graph query further based on the graph query, the schema of the knowledge graph, and the NLQ.

Example 23 includes the subject matter of example 21, wherein the indication of the error comprises an indication that a relationship between a first entity and a second entity in the graph query does not exist in the knowledge graph, wherein generating the modified graph query comprises: generating, by the LLM, the modified graph query including a relationship between the first entity and a third entity, wherein the relationship between the first entity and the third entity exists in the knowledge graph.

Example 24 includes the subject matter of example 21, wherein the indication of the error in the graph query comprises an indication that a first direction of a relationship between a first entity and a second entity in the graph query does not exist in the knowledge graph, wherein generating the modified graph query comprises: generating, by the LLM, the modified graph query using a second direction of the relationship between the first entity and the second entity, wherein the second direction of the relationship exists in the knowledge graph.

Example 25 includes the subject matter of example 21, wherein the indication of the error in the graph query comprises an indication that a property of an entity in the graph query does not exist in the knowledge graph, wherein generating the modified graph query comprises: generating, by the LLM, the modified graph query using another property of the entity, wherein the another property of the entity exists in the knowledge graph.

Example 26 includes the subject matter of example 21, wherein the indication of the error in the graph query comprises an indication that a result of executing the graph query against the knowledge graph comprises an empty set, the one or more processing devices to perform operations comprising: receiving, by the LLM from the query management module, a candidate term for the modified graph query, the candidate term based on an embedding of the candidate term and an embedding for a property in the graph query, wherein the modified graph query includes the candidate term as the property.

Example 27 includes the subject matter of example 21, the one or more processing devices to perform operations comprising, prior to receiving the indication of the error: generating, by the LLM, the graph query based on a schema of the knowledge graph and the NLQ.

Example 28 includes a non-transitory computer-readable medium storing executable instructions, which when executed by one or more processing devices, cause the one or more processing devices to perform operations comprising: receiving, by a query management module from a large language model (LLM), a graph query generated by the LLM based on a natural language query (NLQ); validating, by a validation module, the graph query; executing, by the query management module based on the validation of the graph query, the graph query against a knowledge graph to receive a result; and returning, by a natural language response module, a natural language response based on the result as a response to the NLQ.

Example 29 includes the subject matter of example 28, wherein validating the graph query comprises: extracting, by the validation module, a relationship between two entities from the graph query; and determining, by the validation module, that the relationship exists in the knowledge graph.

Example 30 includes the subject matter of example 28, wherein validating the graph query comprises: extracting, by the validation module, a direction of a relationship between two entities from the graph query; and determining, by the validation module, that the direction of the relationship between the two entities in the graph query matches a direction of a relationship between the two entities in the knowledge graph.

Example 31 includes the subject matter of example 28, wherein validating the graph query comprises: identifying, by the validation module, a property of an entity in the graph query; and determining, by the validation module, that the property of the entity exists in the knowledge graph.

Example 32 includes the subject matter of example 28, wherein the validation module validates the graph query based at least in part on a schema of the knowledge graph.

What is claimed is:

1. A method, comprising:
receiving, by a query management module executing on a processor from a large language model (LLM), a graph query generated by the LLM based on a natural language query (NLQ);
identifying, by a validation module, an error in the graph query based at least in part on parsing the graph query and comparing the graph query to a knowledge graph;
providing, by the query management module, an indication of the error to the LLM;
receiving, by the query management module, a modified graph query from the LLM;
validating, by the validation module, the modified graph query; and
executing, by the query management module based on the validation of the modified graph query, the modified graph query against the knowledge graph to return a result as a response to the NLQ.

2. The method of claim 1, wherein identifying the error in the graph query comprises:
extracting, by the validation module, a relationship between two entities from the graph query; and
determining, by the validation module, that the relationship does not exist in the knowledge graph, wherein the indication of the error includes an indication that the relationship does not exist in the knowledge graph.

3. The method of claim 1, wherein identifying the error in the graph query comprises:
identifying, by the validation module, a property of an entity in the graph query; and
determining, by the validation module, that the property of the entity does not exist in the knowledge graph, wherein the indication of the error includes an indication that the property of the entity does not exist in the knowledge graph.

4. The method of claim 1, wherein identifying the error in the graph query comprises:
identifying, by the validation module, a relationship between two entities in the graph query;
receiving, by the validation module, a relationship between the two entities in the knowledge graph; and
determining, by the validation module, that a direction of the relationship between the two entities in the graph query does not match a direction of the relationship between the two entities in the knowledge graph, wherein the indication of the error includes an indication that the direction of the relationship between the two entities in the graph query is incorrect.

5. The method of claim 1, further comprising:
determining, by the query management module, that the result is an empty set;
determining, by the validation module, a property in the modified graph query;
computing, by the validation module, an embedding for the property;

selecting, by the validation module, an embedding for another property based on a similarity between the embedding for the property and the embedding for the another property;
receiving, by the query management module from the LLM, another modified graph query based on the embedding for the another property; and
executing, by the query management module, the another modified graph query against the knowledge graph to return another result as the response to the NLQ.

6. The method of claim 1, further comprising prior to receiving the graph query:
determining, by the query management module, a context of the NLQ; and
requesting, by the query management module, the graph query from the LLM based on the NLQ and the context of the NLQ.

7. The method of claim 1, further comprising:
retraining the LLM based at least in part on the indication of the error.

8. The method of claim 1, further comprising:
receiving, by the query management module, a tuple as the result from the knowledge graph, wherein the tuple comprises a relationship between two entities;
generating, by a natural language response module, a natural language response based on the tuple; and
returning, by the query management module, the natural language response as the response to the NLQ.

9. The method of claim 1, wherein parsing the graph query comprises extracting an element from the graph query, and comparing the graph query to the knowledge graph comprises determining whether the element is present in the knowledge graph.

10. A system comprising:
a processing device; and
a non-transitory computer-readable storage medium storing instructions that, responsive to execution by the processing device, causes the processing device to perform operations comprising:
receiving, by a large language model (LLM) from a query management module, an indication of an error in a graph query and a context of the graph query, the graph query generated by the LLM based on a natural language query (NLQ), and the indication of the error in the graph query being based at least in part on the graph query being parsed and compared to a knowledge graph;
generating, by the LLM, a modified graph query based on the indication of the error and the context of the graph query; and
returning, by the LLM, the modified graph query to the query management module for execution against the knowledge graph.

11. The system of claim 10, wherein the context of the graph query comprises the graph query, a schema of the knowledge graph, and the NLQ, wherein the LLM generates the modified graph query further based on the graph query, the schema of the knowledge graph, and the NLQ.

12. The system of claim 10, wherein the indication of the error comprises an indication that a relationship between a first entity and a second entity in the graph query does not exist in the knowledge graph, wherein generating the modified graph query comprises:
generating, by the LLM, the modified graph query including a relationship between the first entity and a third entity, wherein the relationship between the first entity and the third entity exists in the knowledge graph.

13. The system of claim 10, wherein the indication of the error in the graph query comprises an indication that a first direction of a relationship between a first entity and a second entity in the graph query does not exist in the knowledge graph, wherein generating the modified graph query comprises:

generating, by the LLM, the modified graph query using a second direction of the relationship between the first entity and the second entity, wherein the second direction of the relationship exists in the knowledge graph.

14. The system of claim 10, wherein the indication of the error in the graph query comprises an indication that a property of an entity in the graph query does not exist in the knowledge graph, wherein generating the modified graph query comprises:

generating, by the LLM, the modified graph query using another property of the entity, wherein the another property of the entity exists in the knowledge graph.

15. The system of claim 10, wherein the indication of the error in the graph query comprises an indication that a result of executing the graph query against the knowledge graph comprises an empty set, the processing device to perform operations comprising:

receiving, by the LLM from the query management module, a candidate term for the modified graph query, the candidate term based on an embedding of the candidate term and an embedding for a property in the graph query, wherein the modified graph query includes the candidate term as the property.

16. The system of claim 10, the processing device to perform operations comprising, prior to receiving the indication of the error:

generating, by the LLM, the graph query based on a schema of the knowledge graph and the NLQ.

17. A non-transitory computer-readable medium storing executable instructions, which when executed by one or more processing devices, cause the one or more processing devices to perform operations comprising:

receiving, by a query management module from a large language model (LLM), a graph query generated by the LLM based on a natural language query (NLQ);

validating, by a validation module, the graph query based at least in part on parsing the graph query and comparing the graph query to a knowledge graph;

executing, by the query management module based on the validation of the graph query, the graph query against the knowledge graph to receive a result; and returning, by a natural language response module, a natural language response based on the result as a response to the NLQ.

18. The non-transitory computer-readable medium of claim 17, wherein validating the graph query comprises:

extracting, by the validation module, a relationship between two entities from the graph query; and determining, by the validation module, that the relationship exists in the knowledge graph.

19. The non-transitory computer-readable medium of claim 17, wherein validating the graph query comprises:

extracting, by the validation module, a direction of a relationship between two entities from the graph query; and determining, by the validation module, that the direction of the relationship between the two entities in the graph query matches a direction of a relationship between the two entities in the knowledge graph.

20. The non-transitory computer-readable medium of claim 17, wherein validating the graph query comprises:

identifying, by the validation module, a property of an entity in the graph query; and determining, by the validation module, that the property of the entity exists in the knowledge graph.

* * * * *